US012671563B2

(12) United States Patent
Maricevic et al.

(10) Patent No.: US 12,671,563 B2
(45) Date of Patent: Jun. 30, 2026

(54) DEMAND-DRIVEN DUPLEX

(71) Applicant: ARRIS Enterprises LLC, Suwanee, GA (US)

(72) Inventors: Zoran Maricevic, West Hartford, CT (US); Ayham Al-Banna, Irving, TX (US); Francis J. O'Keeffe, Cork (IE); Thomas Cloonan, Lisle, IL (US); John M. Ulm, Moultonborough, NH (US); Zhijian Sun, Avon, CT (US); Marcel Franz Christian Schemmann, Maria Hoop (NL)

(73) Assignee: ARRIS Enterprises LLC, Horsham, PA (US)

( * ) Notice: Subject to any disclaimer, the term of this patent is extended or adjusted under 35 U.S.C. 154(b) by 656 days.

(21) Appl. No.: 17/988,691

(22) Filed: Nov. 16, 2022

(65) Prior Publication Data

US 2023/0155804 A1    May 18, 2023

Related U.S. Application Data

(60) Provisional application No. 63/281,015, filed on Nov. 18, 2021.

(51) Int. Cl.
H04L 5/14      (2006.01)
H04L 12/28     (2006.01)

(52) U.S. Cl.
CPC ........ *H04L 5/1423* (2013.01); *H04L 12/2885* (2013.01); *H04L 12/2801* (2013.01)

(58) Field of Classification Search
None
See application file for complete search history.

(56) References Cited

U.S. PATENT DOCUMENTS

| | | | |
|---|---|---|---|
| 2003/0090320 A1* | 5/2003 | Skrobko | H04B 10/6911 330/195 |
| 2011/0280574 A1* | 11/2011 | Finkelstein | H04L 12/2896 398/79 |
| 2014/0003307 A1* | 1/2014 | Williams | H04W 72/20 370/294 |
| 2018/0331752 A1* | 11/2018 | Ashworth | H04B 7/15542 |
| 2019/0190684 A1* | 6/2019 | Bowler | H04L 12/2801 |
| 2020/0153412 A1* | 5/2020 | Nosaka | H03H 9/72 |
| 2020/0304278 A1* | 9/2020 | Hung | H04L 5/08 |

* cited by examiner

*Primary Examiner* — Jay L Vogel
(74) *Attorney, Agent, or Firm* — Chernoff, Vilhauer, McClung & Stenzel, LLP

(57) ABSTRACT

An apparatus for implementing soft duplex operation of a communications network that transmits downstream signals from a service provider to a subscriber and upstream signals from the subscriber to the service provider. The apparatus may include a pair of opposed triplexers defining a first signal path through a first amplifier and a second signal path through a second amplifier. The apparatus may also include at least one switch that selectively alternates a mid0band signal between an upstream signal and a downstream signal.

8 Claims, 39 Drawing Sheets

| N+X | RF Ports Per AMP | # Of US RF Segments | # Of DS RF Segments | DS% |
|---|---|---|---|---|
| N+1 | 2 | 2 | 1 | 33% |
| N+1 | 4 | 2 | 3 | 60% |
| N+2 | 2 | 3 | 4 | 57% |
| N+2 | 3 | 3 | 10 | 77% |
| N+3 | 2 | 4 | 11 | 73% |
| N+4 | 2 | 5 | 26 | 84% |

FIG. 6

1.8GHz Tap, Hardline EoL Bit-Loading-1050' Amp Spacing, N+3

1.8GHz Tap, Hardline EoL Bit-Loading-1050' Amp Spacing, N+6

| Mixed Mode Levels | # Mixed Mode Amps | # Of US RF Legs | # Of DS RF Legs | DS% |
|---|---|---|---|---|
| 1 | 1 | 16 | 15 | 48% |
| 2 | 3 | 9 | 22 | 71% |
| 3 | 7 | 6 | 25 | 81% |
| 4 | 15 | 5 | 26 | 84% |

FIG. 12

DEMAND-DRIVEN DUPLEX

CROSS REFERENCE TO RELATED APPLICATIONS

This application claims the benefit of U.S. Provisional Patent Application Ser. No. 63/281,015 filed Nov. 18, 2021.

BACKGROUND

The subject matter of this application relates to improved systems and methods for communicating data using upstream spectrum that overlaps with downstream spectrum.

Cable Television (CATV) services provide content to large groups of subscribers from a central delivery unit, called a "head end," which distributes channels of content to its subscribers from this central unit through a branch network comprising a multitude of intermediate nodes. Modern Cable Television (CATV) service networks, however, not only provide media content such as television and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber and to the content provider through the branch network.

To this end, CATV head ends have traditionally included a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV systems adopt distributed architectures, such as Remote PHY (or R-PHY), Remote MAC-PHY or other architectures that relocate traditional functionality of the CCAP into the network's fiber nodes.

Regardless of which such architectures were employed, previous implementations of CATV systems bifurcated available bandwidth into upstream and downstream transmissions i.e., data was only transmitted in one direction across any part of the spectrum. For example, early iterations of the Data Over Cable Service Interface Specification (DOCSIS) specified assigned upstream transmissions to a frequency spectrum between 5 MHz and 42 MHz, and assigned downstream transmissions to a frequency spectrum between 54 MHz and 750 MHz. Though later iterations of the DOCSIS standard expanded the width of the spectrum reserved for each of the upstream and downstream transmission paths, the spectrum assigned to each respective direction did not overlap.

Segmenting spectrum between upstream and downstream transmission, however, makes it difficult to deliver multi-gigabit services, as well as to fulfill recent trends in the cable industry such as deployment of DOCSIS 3.1 Orthogonal Frequency Division Multiplexing (OFDM), deep fiber migration, and distributed access architectures such as R-PHY, R-MACPHY etc.

Recently, in an attempt to offer symmetric services in both upstream and downstream, new DOCSIS 4.0 Full Duplex (FDX) standards have been introduced to use the coaxial network bandwidth simultaneously for both upstream and downstream traffic. With FDX DOCSIS, upstream and downstream spectrum is no longer separated, allowing up to 5 Gbps upstream service and 10 Gbps downstream service over the cable access network. In a full duplex system, because the CCAP/R-PHY core knows the characteristics of its own downstream transmission, it can distinguish upstream communications transmitted in the same frequencies that it provides those downstream services.

While FDX is truly full-duplex from the CCAP/R-PHY perspective, it only half-duplex from a given cable modem's perspective. A cable modem can be either transmitting or receiving, but not both, on any given FDX channel in the FDX band. It also turns out that a cable modem's upstream transmission in an FDX band might generate noise for its neighbors on the same tap or adjacent tap so they cannot hear the downstream transmission either. This is called an Interference Group (IG). Cable Modems (CMs) within an Interference Group are a group of neighboring modems which generate noise levels when they transmit data upstream that overwhelm the downstream signals in that same frequency arriving within the group. The CMs within a single Interference Group cannot distinguish between upstream and downstream transmissions in the same frequency, hence in an FDX architecture the CMTS will simultaneously receive and transmit in the same FDX spectrum, while FDX Cable modems within an Interference Group can either receive or transmit in the same FDX spectrum, but not both. For convenience, the CMTS might group multiple IGs into a single Transmission Group (TG) for scheduling purposes. The FDX band is divided into sub-bands, and the CMTS assigns which sub-band(s) each cable modem uses for upstream or downstream operation. This is referred to as a resource block assignment (RBA). Different cable modems will have different bandwidth demand for both the upstream and downstream directions, which can change over time, and FDX accordingly allows for the RBA to be changed dynamically. Thus, communication is full duplex from the perspective of the CMTS but is frequency division duplex from the perspective of the cable modems within an Interference Group.

Unfortunately, full duplex systems do not work well when there are amplifiers along the path from the last node to the group of subscribers served by the node because the presence of those amplifiers causes all modems along the branch to interfere with each other. This means that an entire RF leg with potentially hundreds of subscribers need to operate in a Time-Division Duplex manner, thus not achieving true full duplex capacity. What is desired, therefore, is an alternative network delivery architecture that allows spectrum to be shared between upstream and downstream transmissions.

BRIEF DESCRIPTION OF THE DRAWINGS

For a better understanding of the invention, and to show how the same may be carried into effect, reference will now be made, by way of example, to the accompanying drawings, in which.

3 connected to a CCAP core through a branch network of RPD devices, are sorted into Interference Groups organized to minimize interference in the downstream signal caused by upstream transmissions.

Figures 2A, 2B:
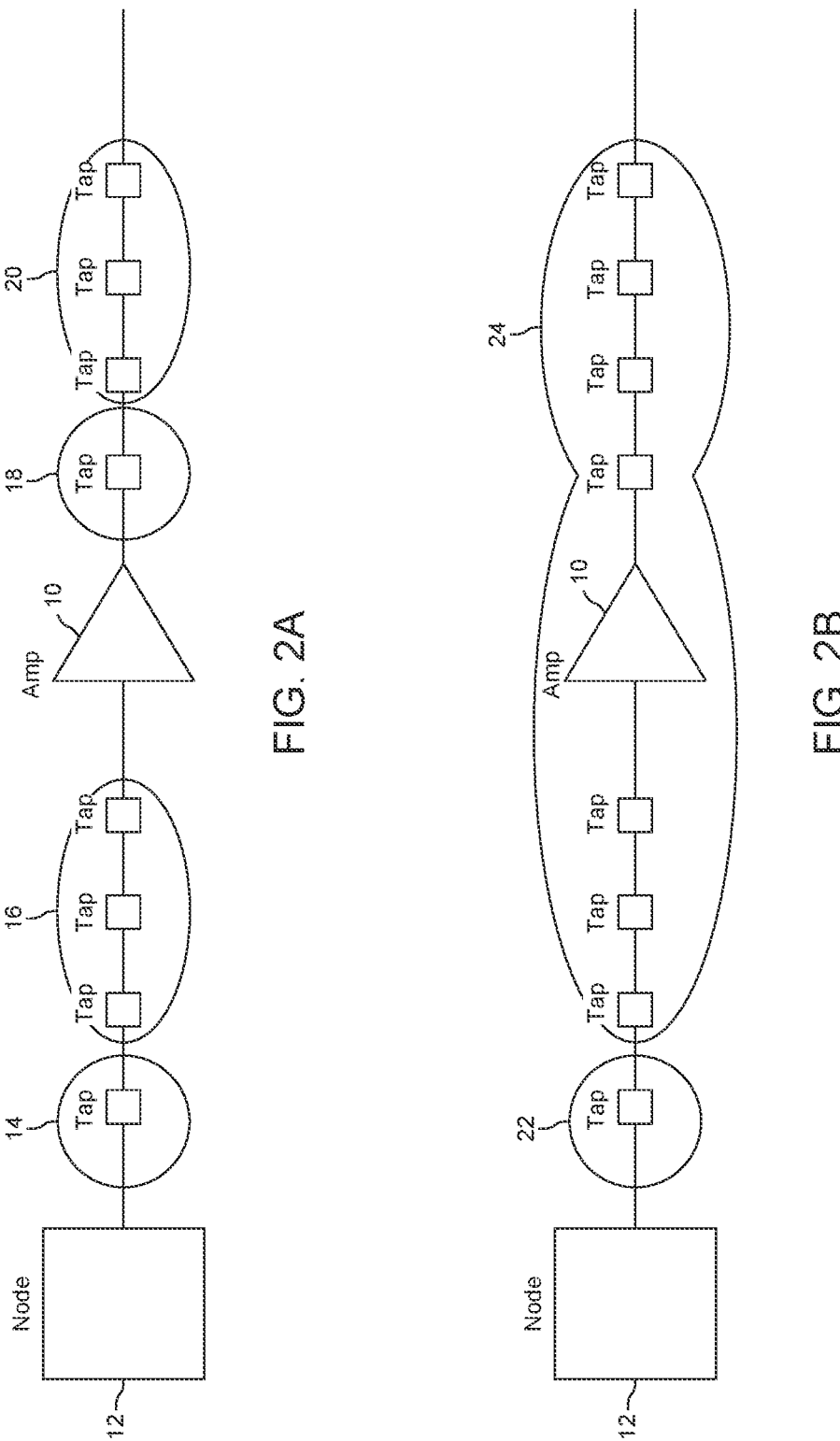

FIG. 2A shows the theoretical effect of a Node+X architecture on interference groups in a full duplex system.

FIG. 2B shows the actual effect of a Node+X architecture on interference groups in a full duplex system.

Figure 3A:
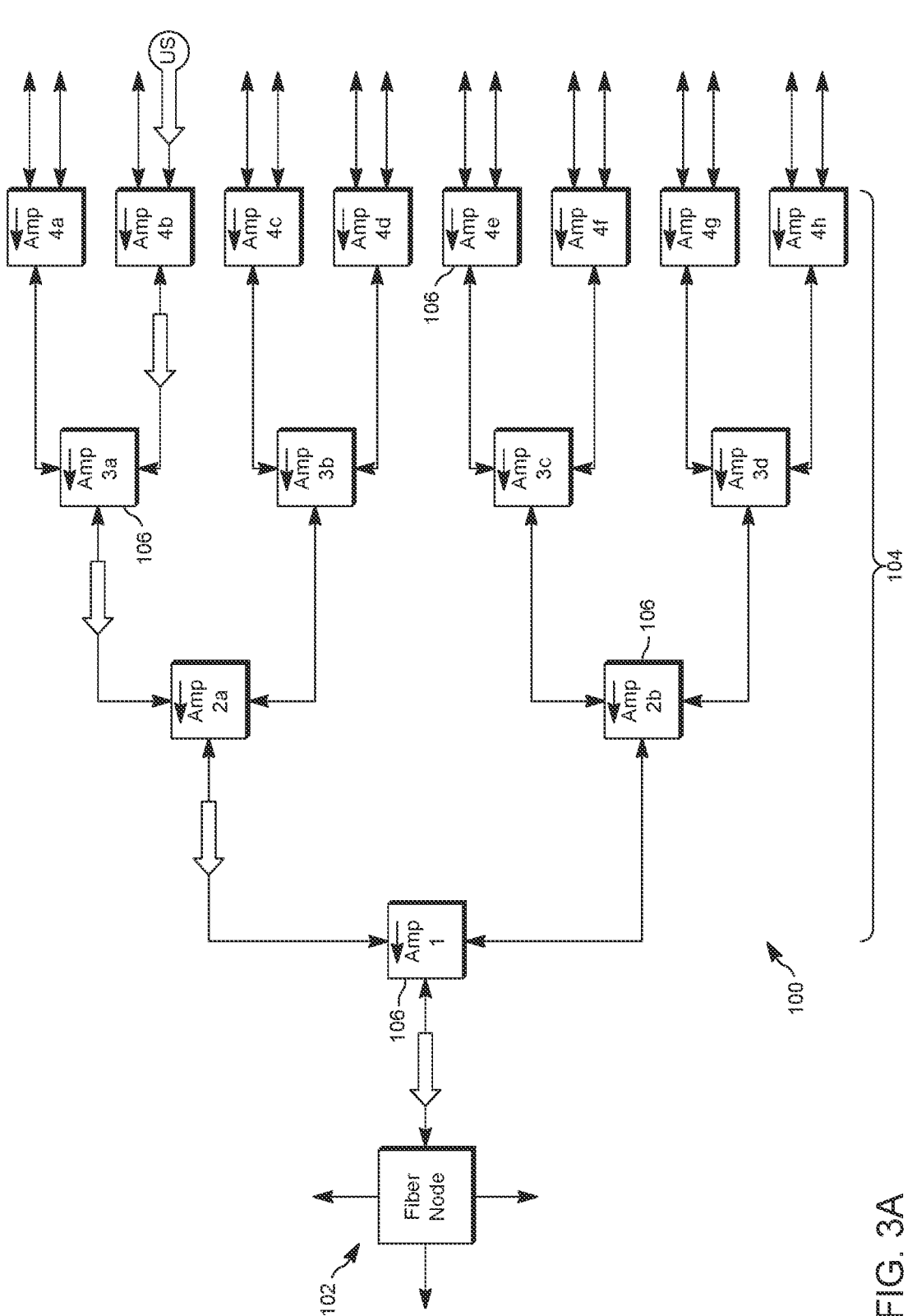
Figure 3B:
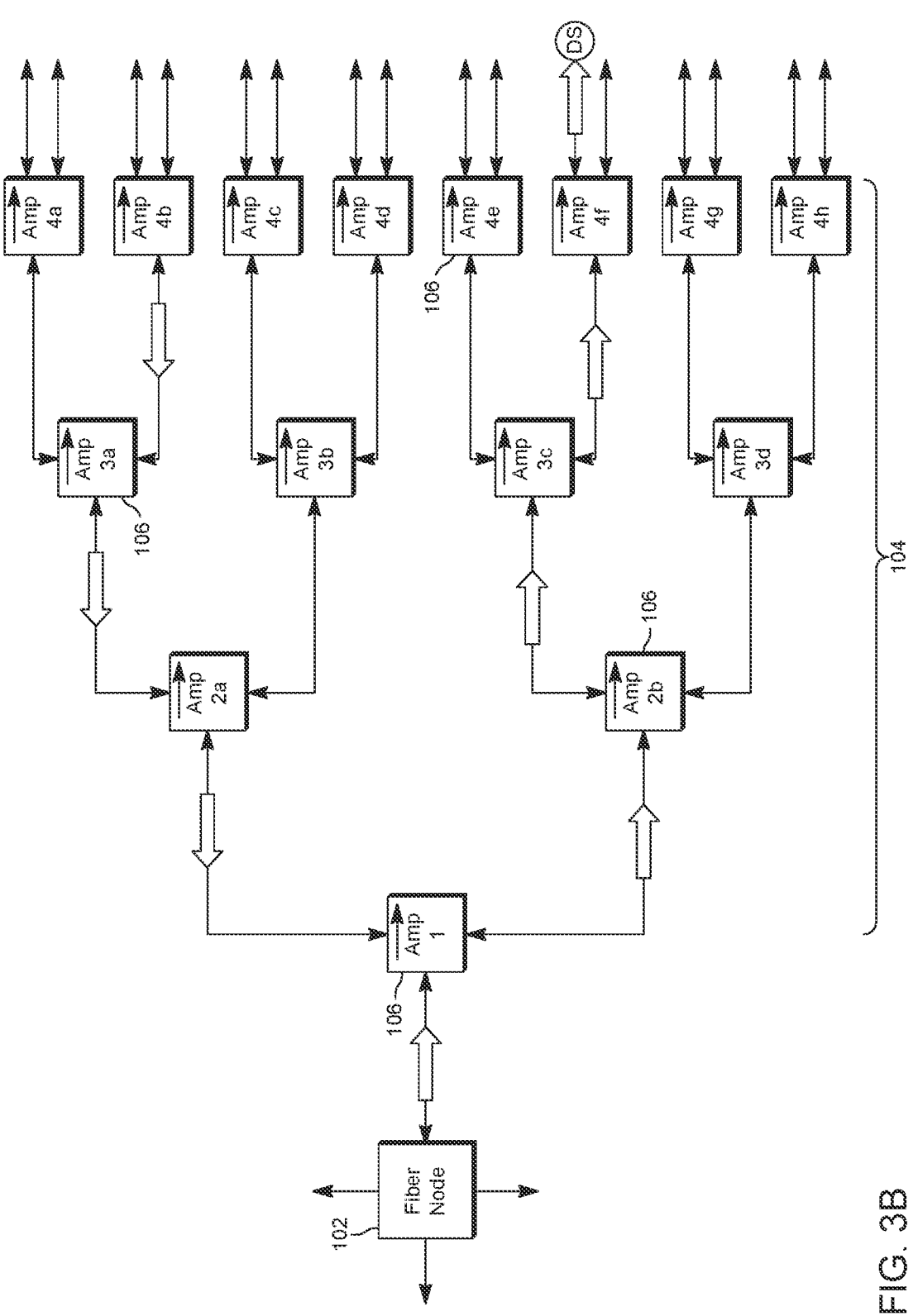

FIGS. 3A and 3B illustrate upstream and downstream flows in a "soft duplex" implementation, where an RF leg from the fiber nodes act as a single interference group. The arrows in the amplifiers show the direction of the "shared" spectrum.

Figure 3C:
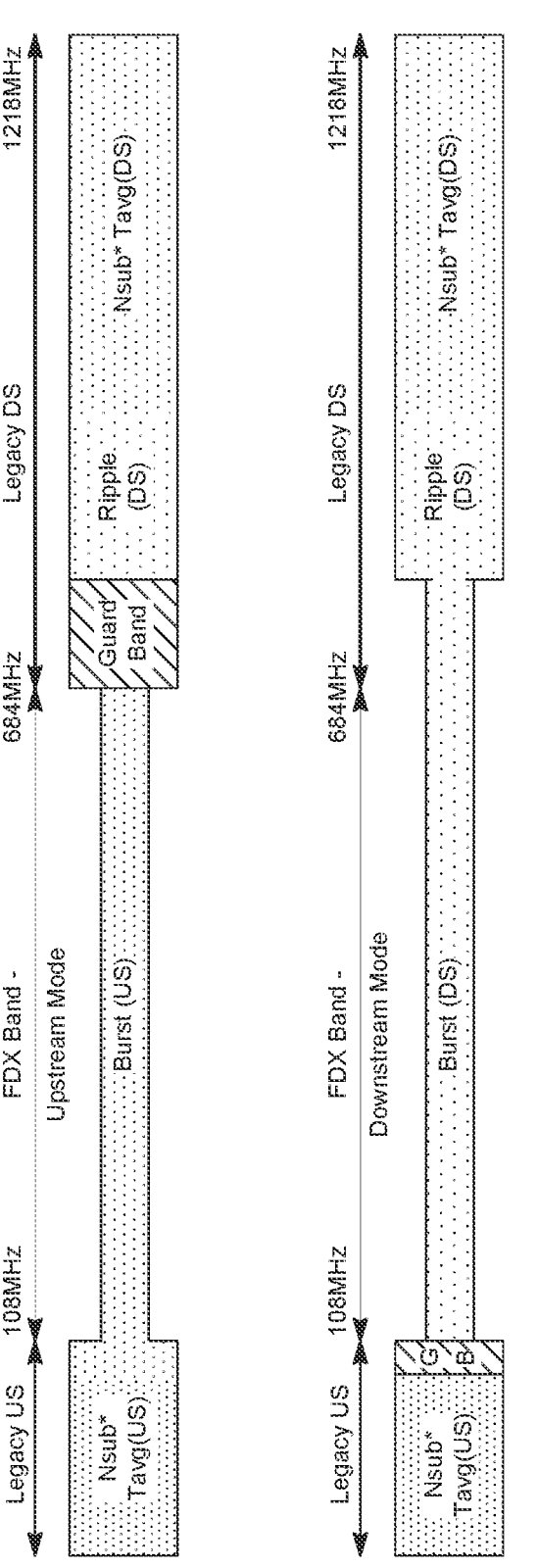

FIG. 3C illustrates the spectrum switching functionality of an amplifier in the soft duplex implementation of FIGS. 3A and 3B, respectively.

Figure 4A:
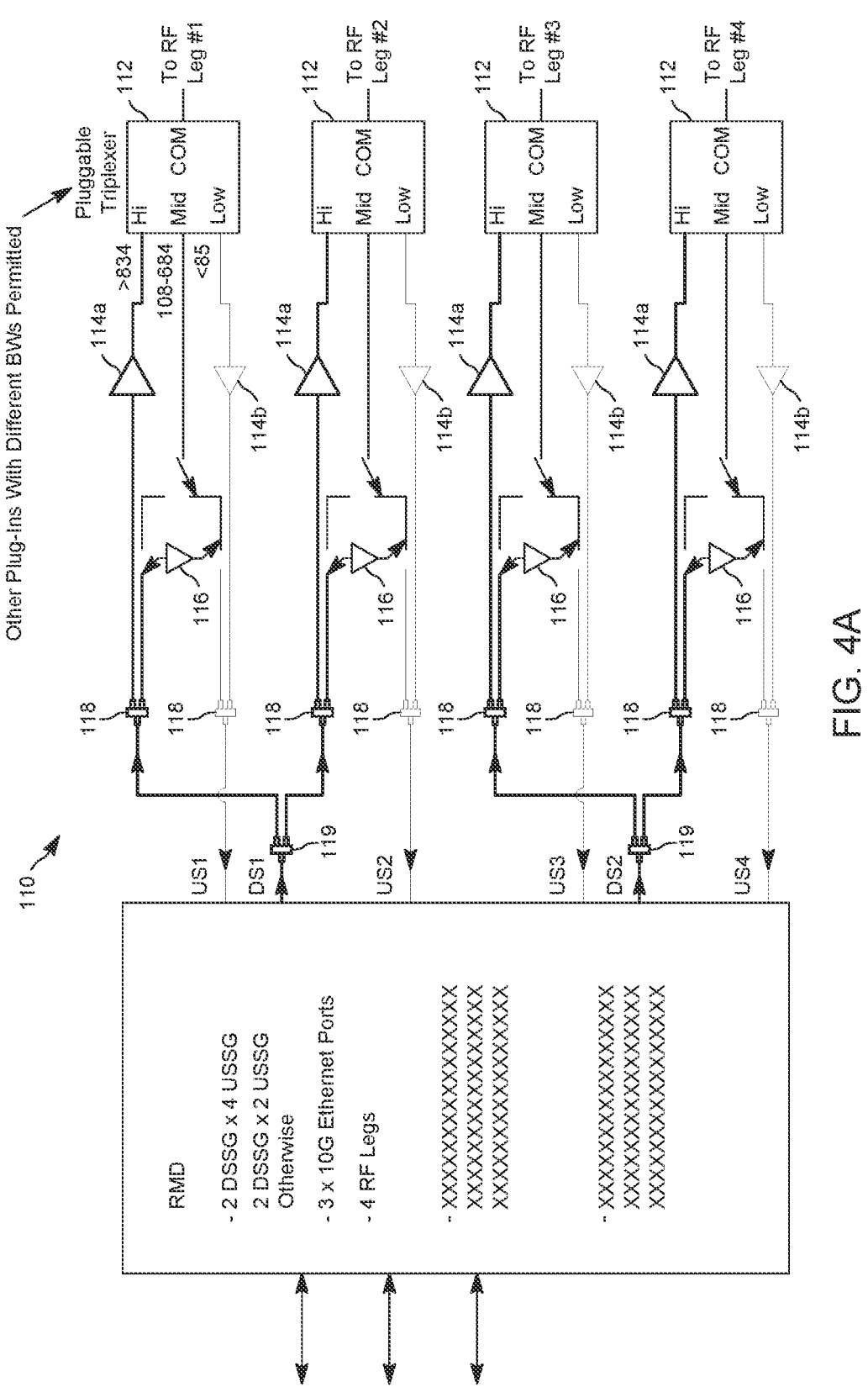
Figure 4B:
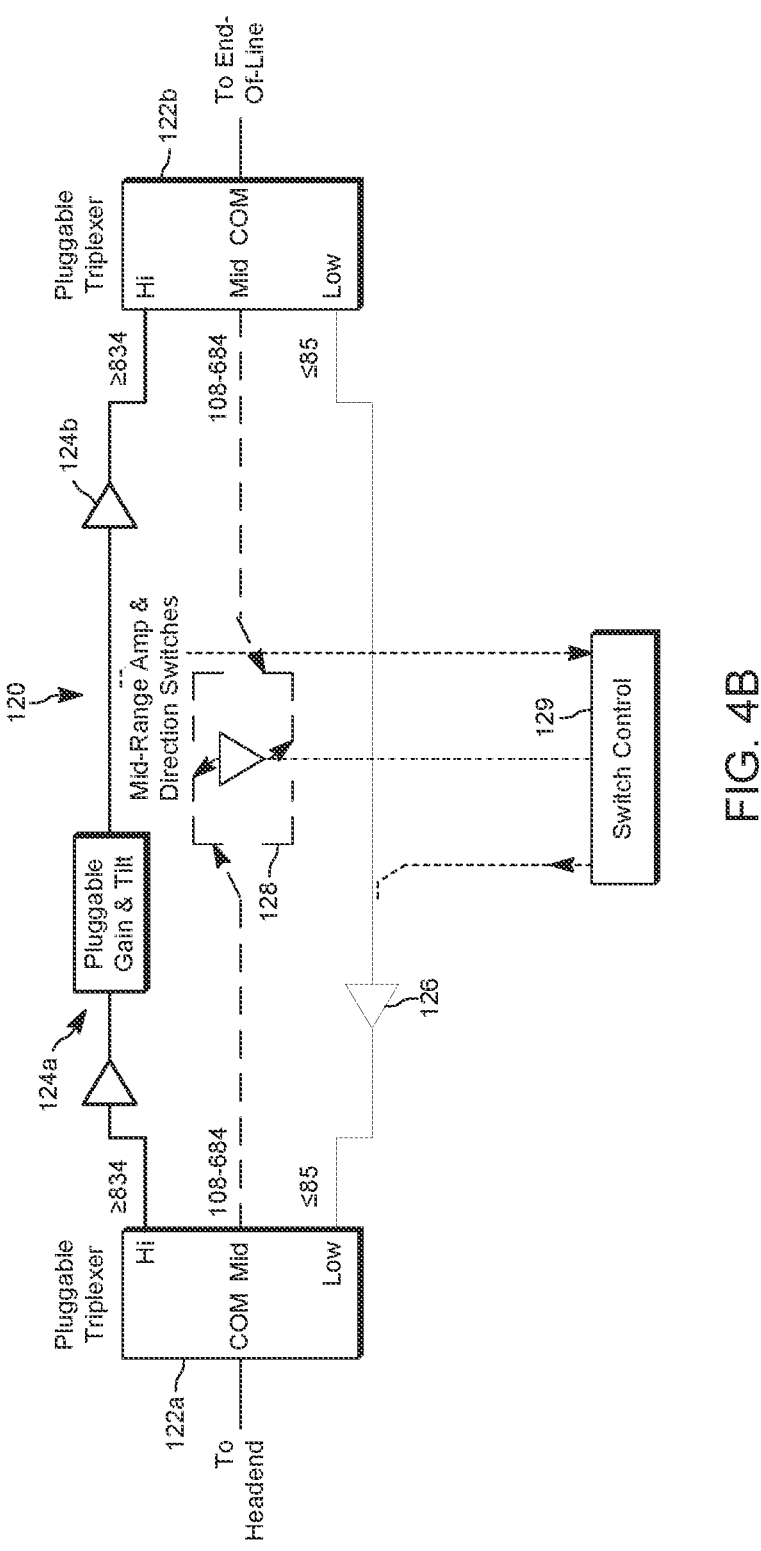
Figure 4C:
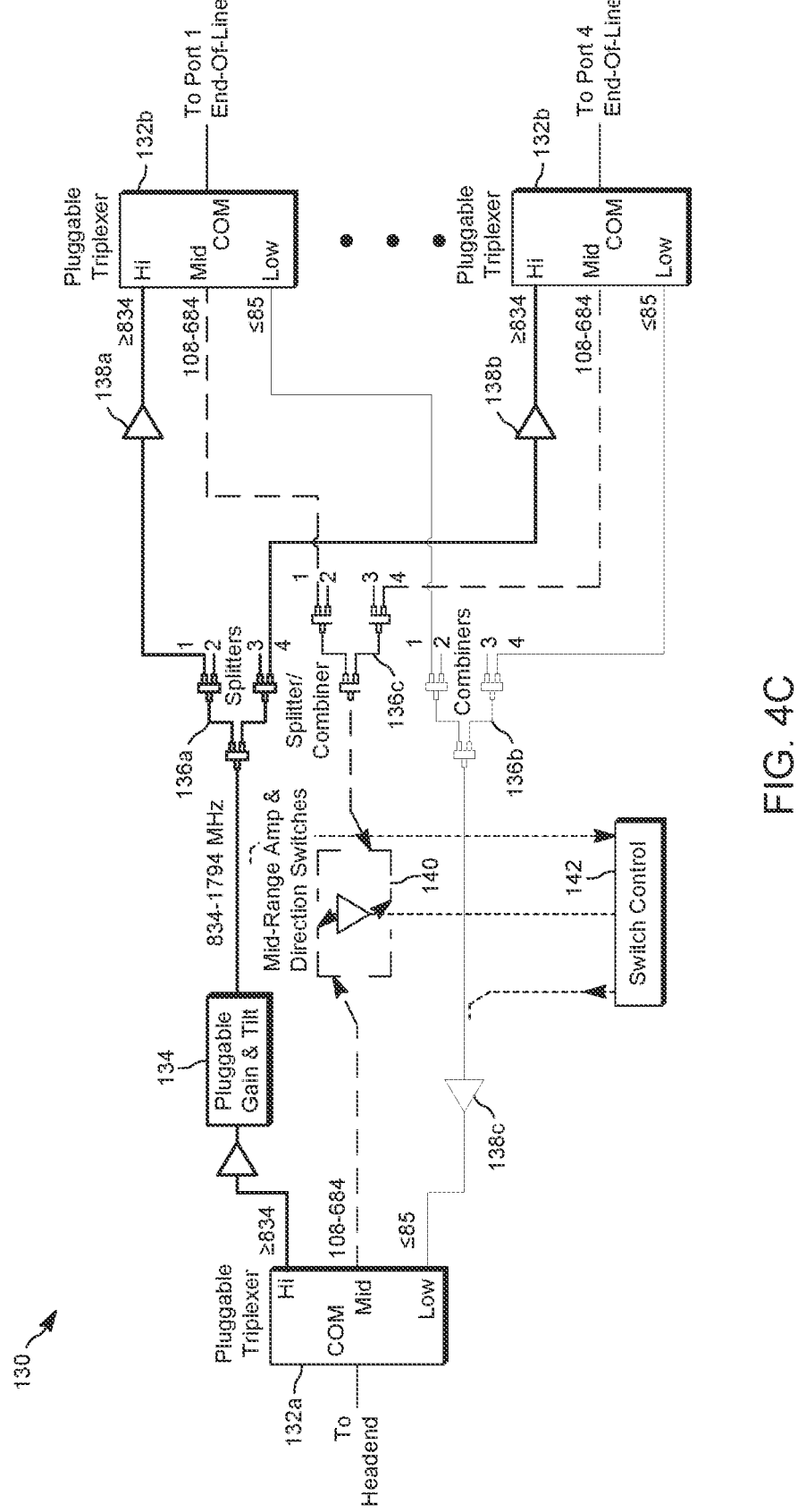

FIGS. 4A-4C show exemplary switching circuits for implementing the soft duplex architecture of FIGS. 3A and 3B in various devices, where FIG. 4A shows the switching circuit in a Fiber Node with a Remote MAC-PHY Device (RMD), FIG. 4B shows the switching circuit in a single port Line Extender amplifier, and FIG. 4C shows the switching circuit in a multi-port Bridger amplifier.

Figure 4D:
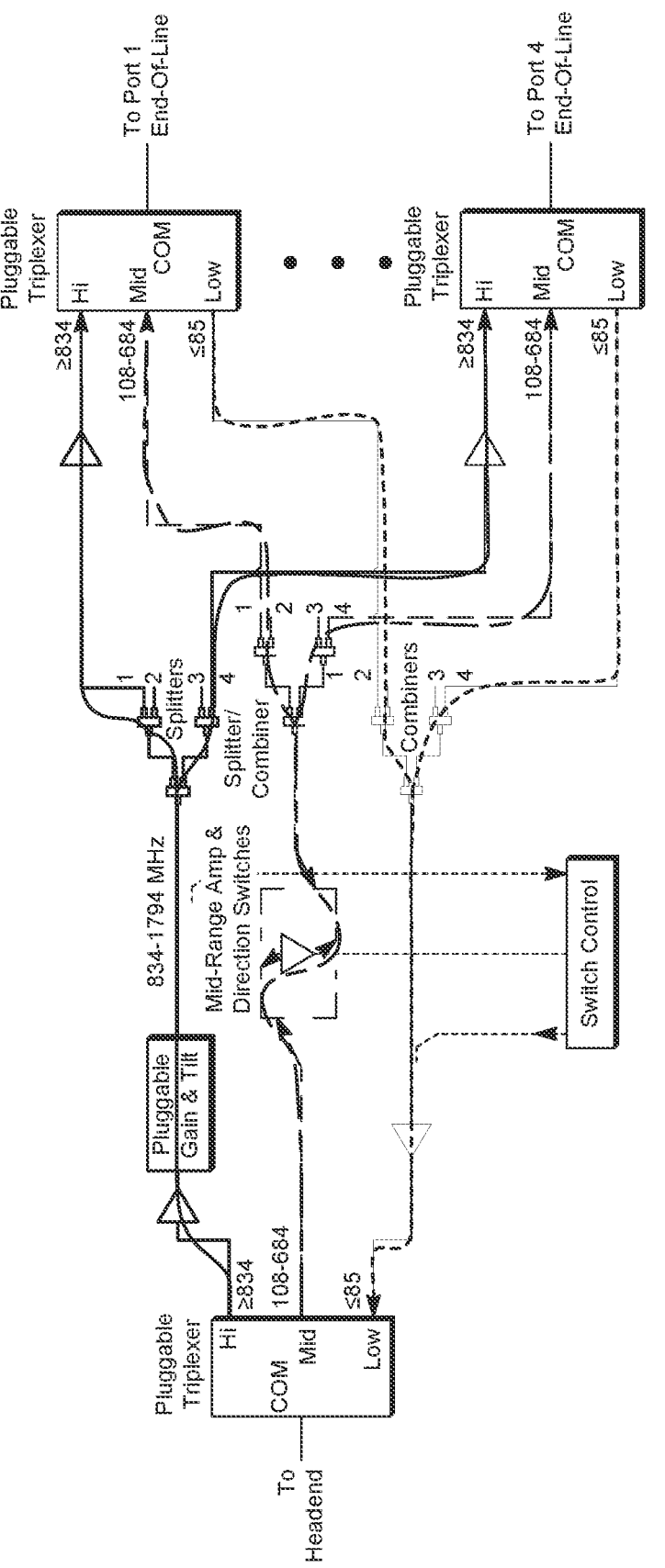
Figure 4E:
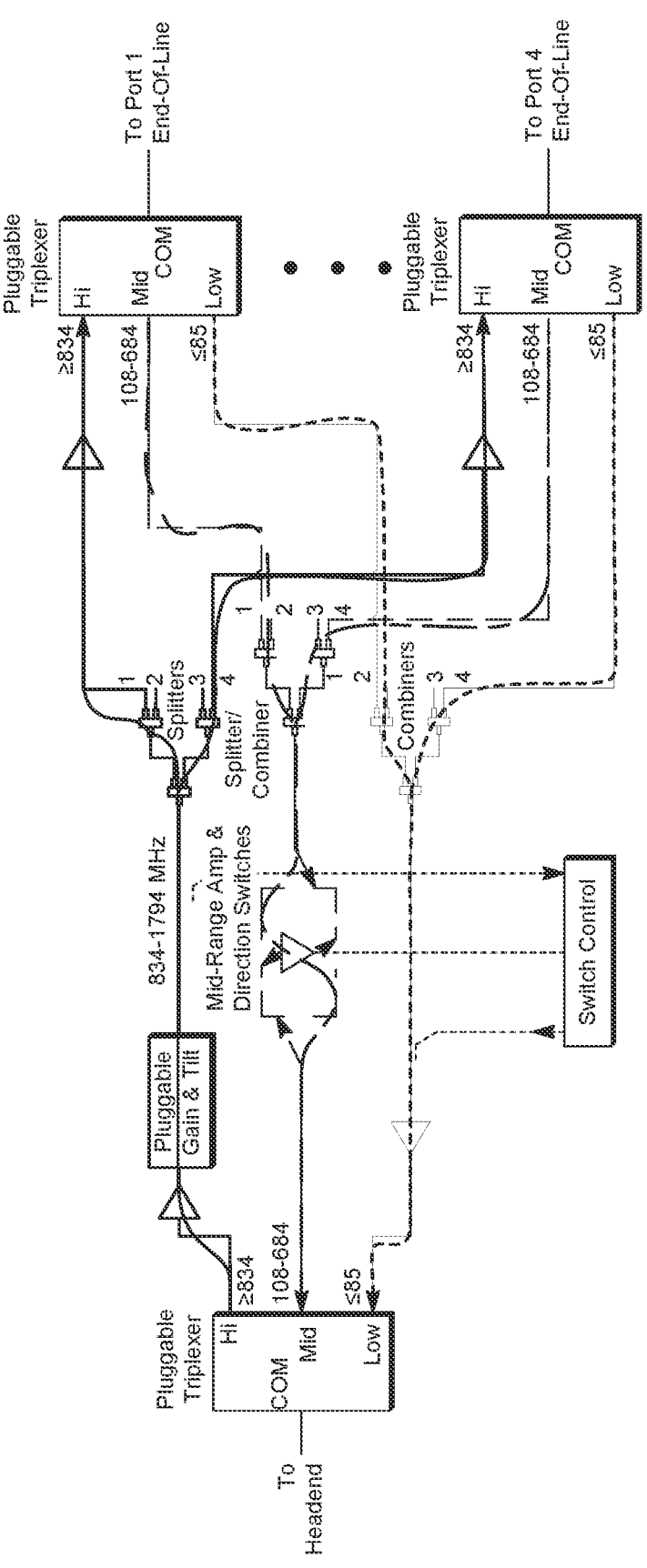

FIGS. 4D and 4E illustrate the operation of the multi-port Bridger amplifier circuit of FIG. 4C when shared spectrum is in the downstream and upstream directions, respectively.

Figure 5A:
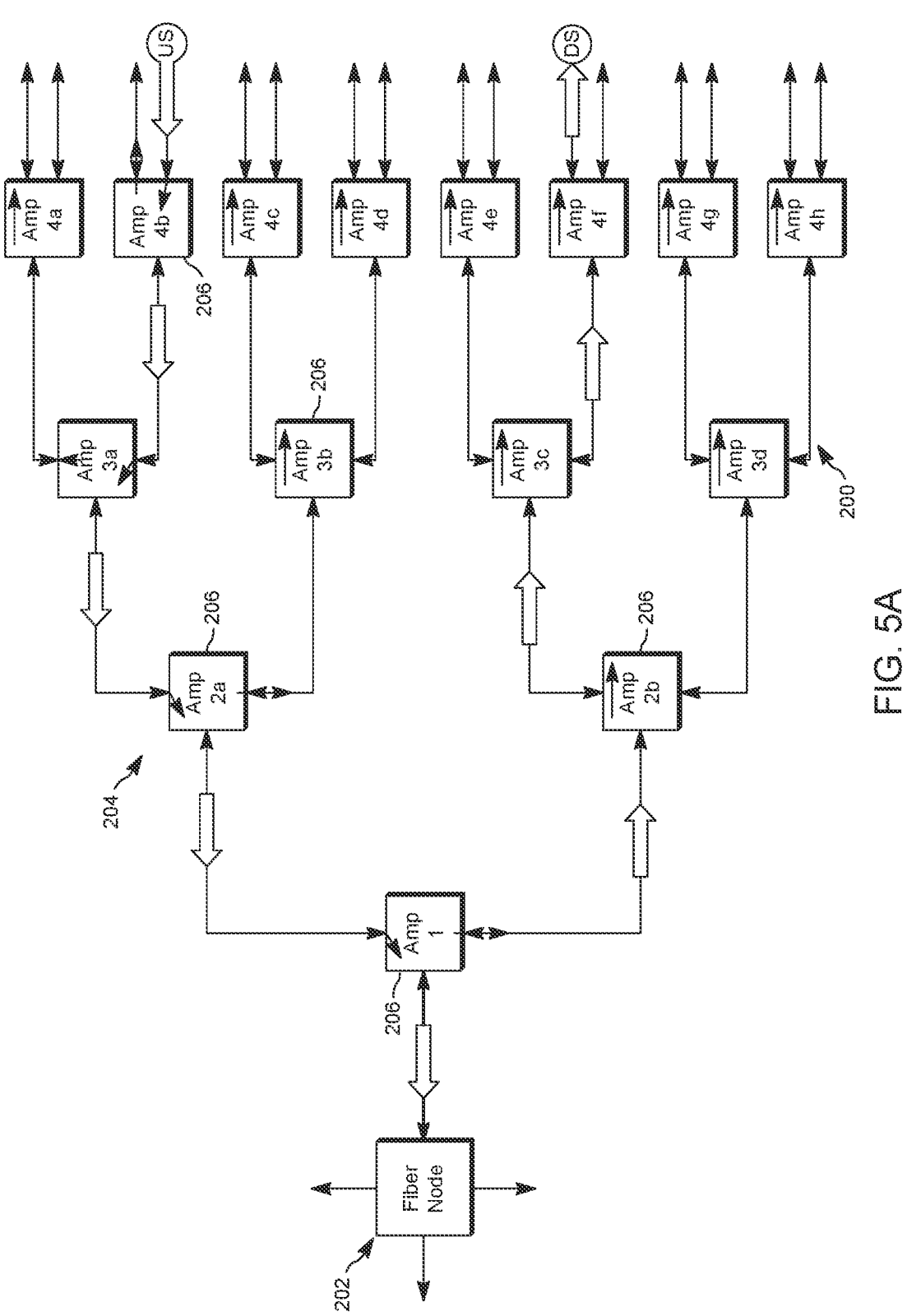

FIG. 5A shows an alternate "mixed mode" implementation of a soft duplex system.

Figures 5B, 5C:
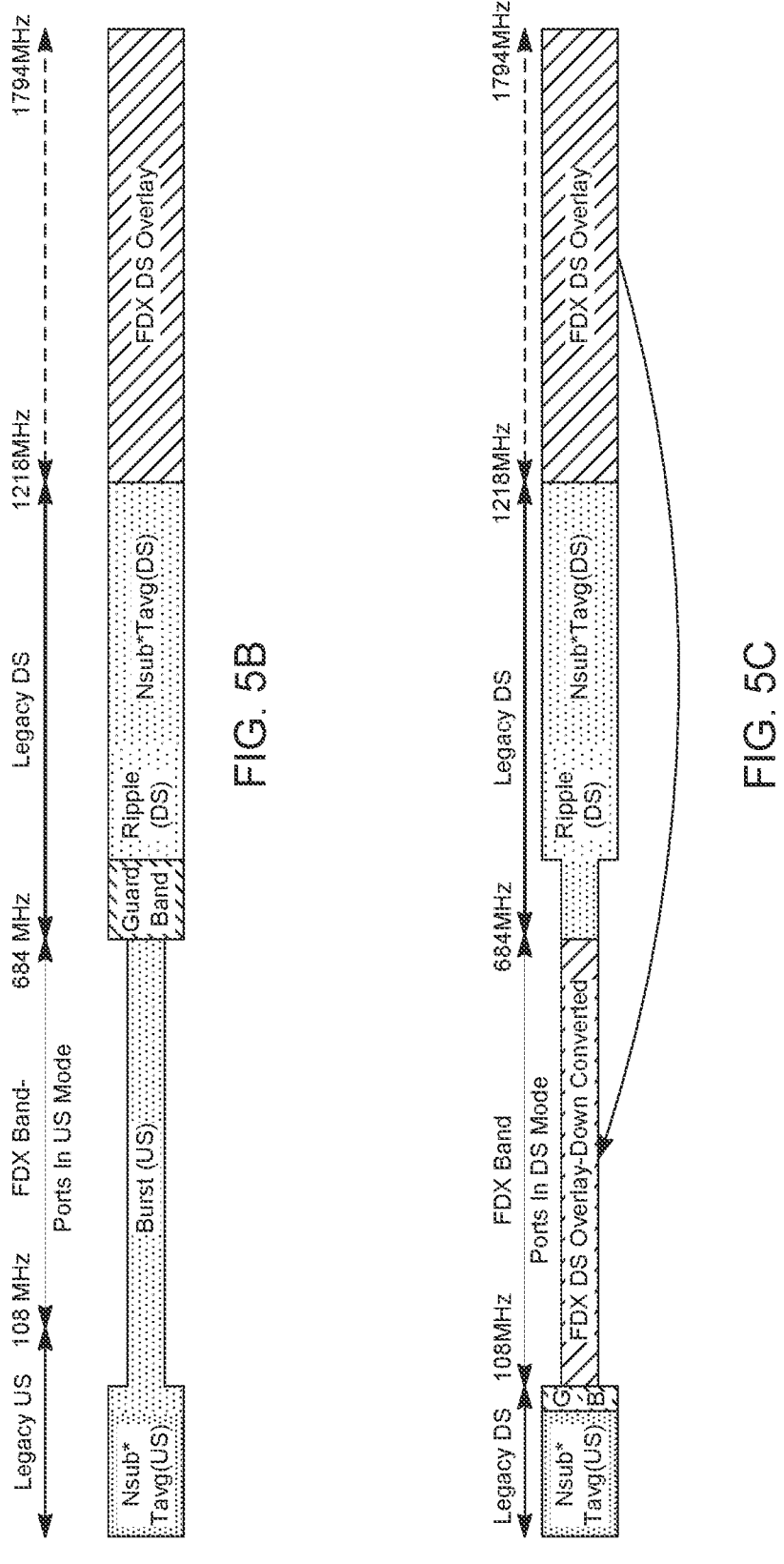

FIGS. 5B and 5C illustrate the switching functionality of an amplifier in the "mixed mode" soft duplex implementation of FIG. 5A.

FIG. 6 shows the benefit of the "mixed mode" implementation of FIG. 5A to provide subscribers in an RF leg who are not transmitting in the upstream to receive downstream transmissions at a time that another subscriber in an RF is transmitting in the upstream.

Figure 7:
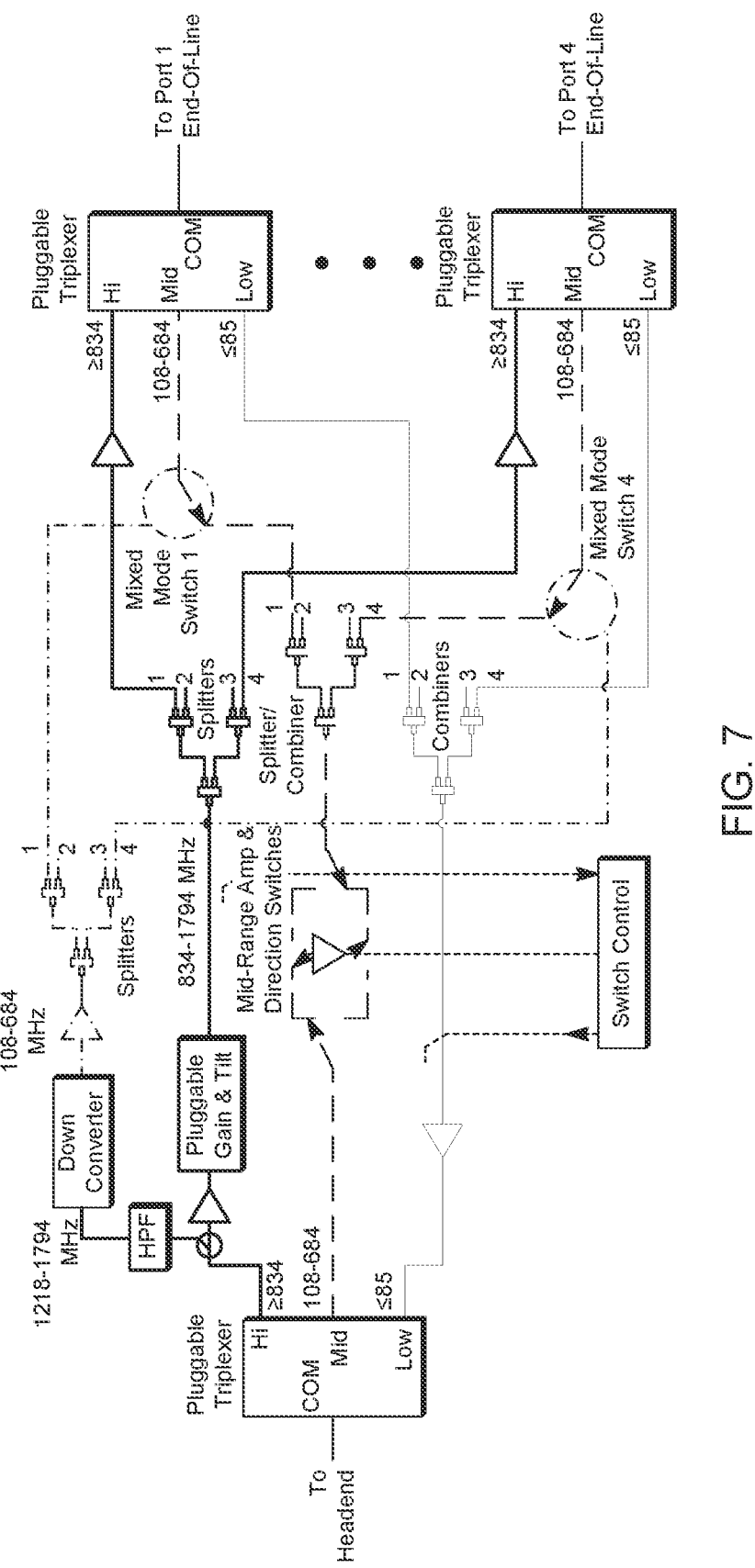

FIG. 7 shows an exemplary amplifier circuit for implementing the "mixed mode" soft duplex system of FIG. 5A FIGS. 8A-8D show various switching functionalities of the amplifier of FIG. 7

Figure 9A:
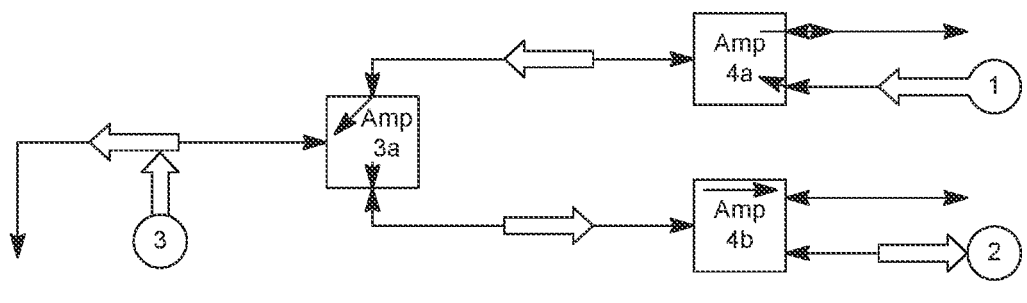
Figure 9B:
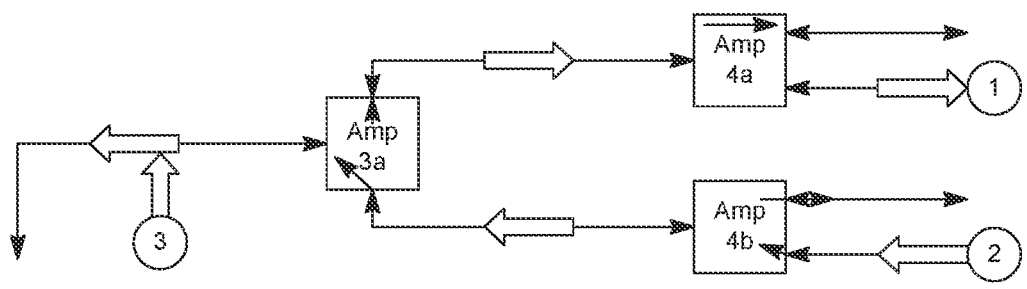
Figure 9C:
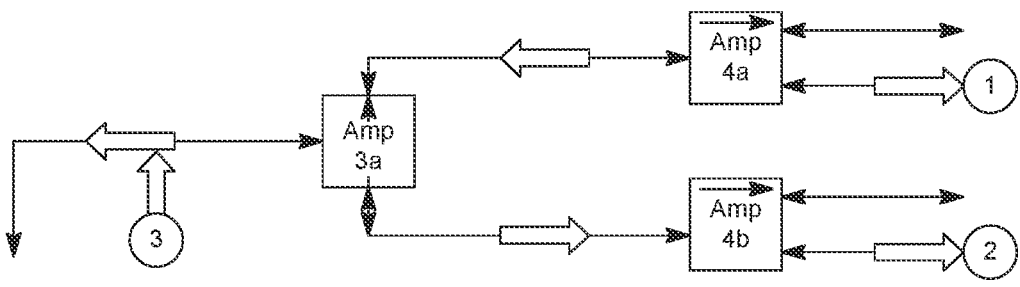

FIGS. 9A-9C show dependencies in transmission groups with the "mixed mode" soft duplex system of FIG. 5A.

FIGS. 10A-10H show exemplary tap and hardline bit loading capacities for different numbers of amplifiers in a chain and spacing between amplifiers.

Figure 11A:
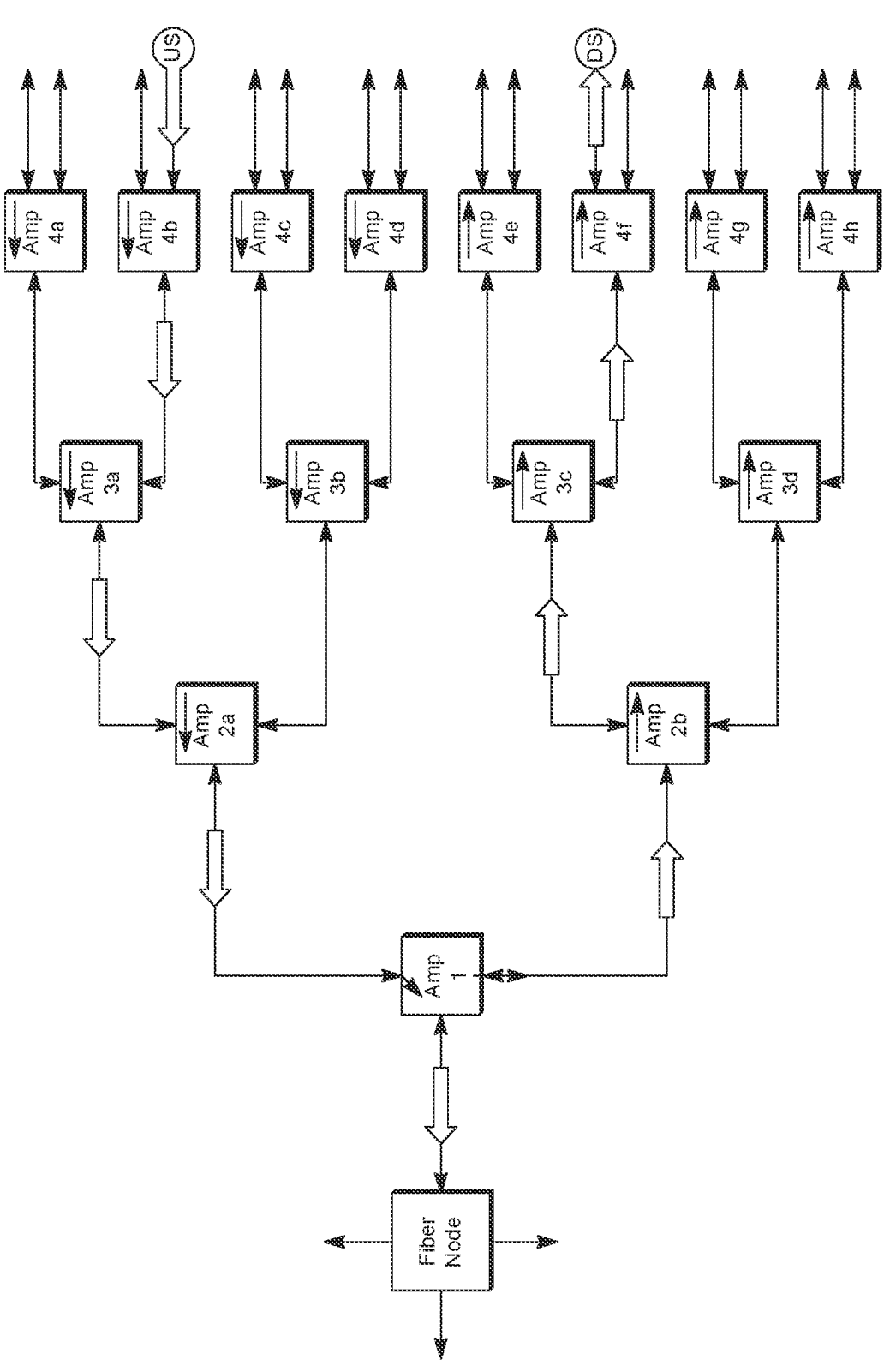
Figure 11B:
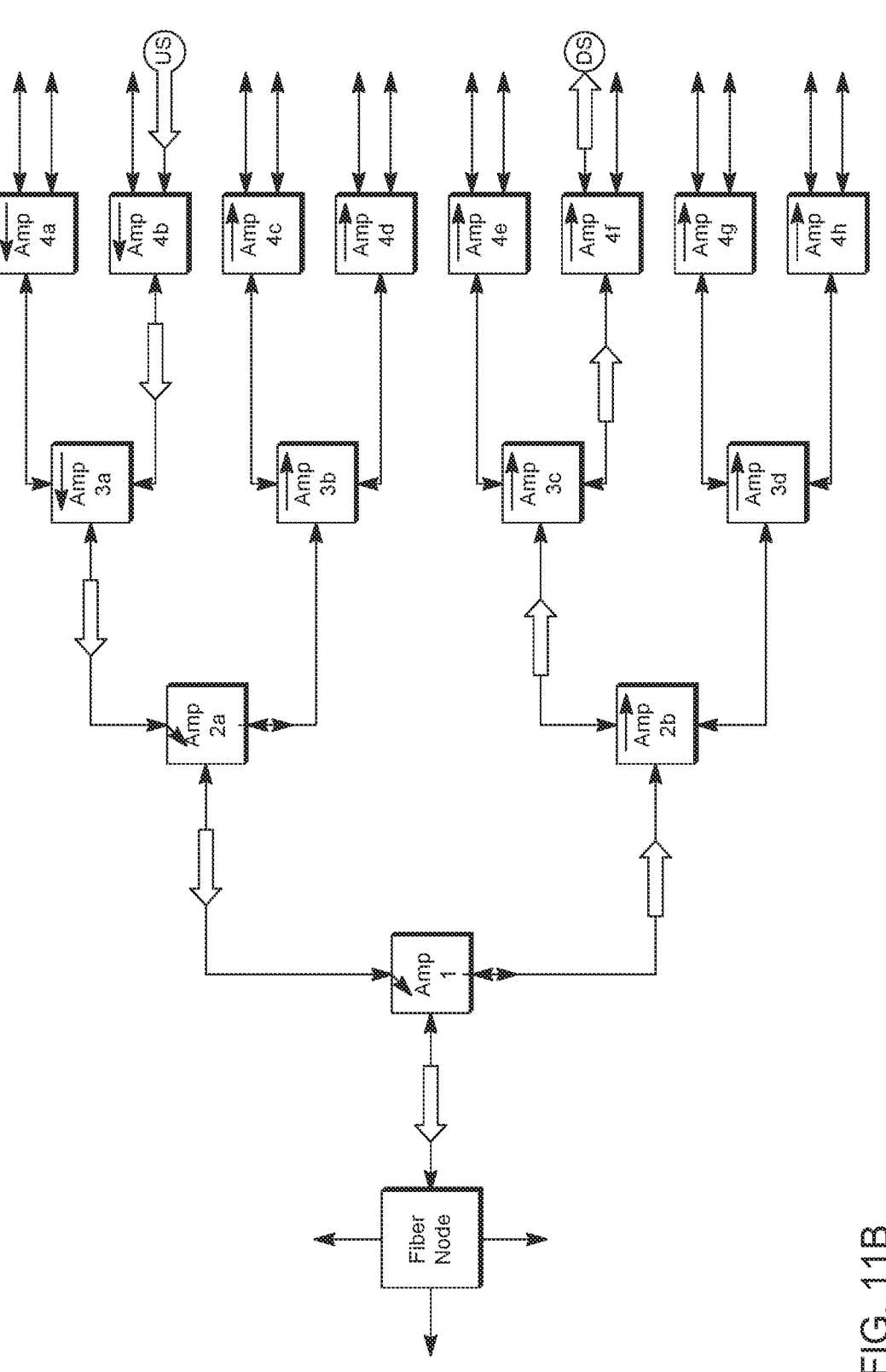

FIGS. 11A and 11B show an alternative "partial" mixed mode soft duplex architecture where only a small subset of amplifiers has mixed mode implementation as shown in FIG. 5A while the majority of amplifiers are traditional soft-duplex implementations as shown in FIGS. 4B and 4C.

FIG. 12 shows the benefits of the "partial" mixed mode soft duplex architecture of FIGS. 11A and 11B.

Figure 13:
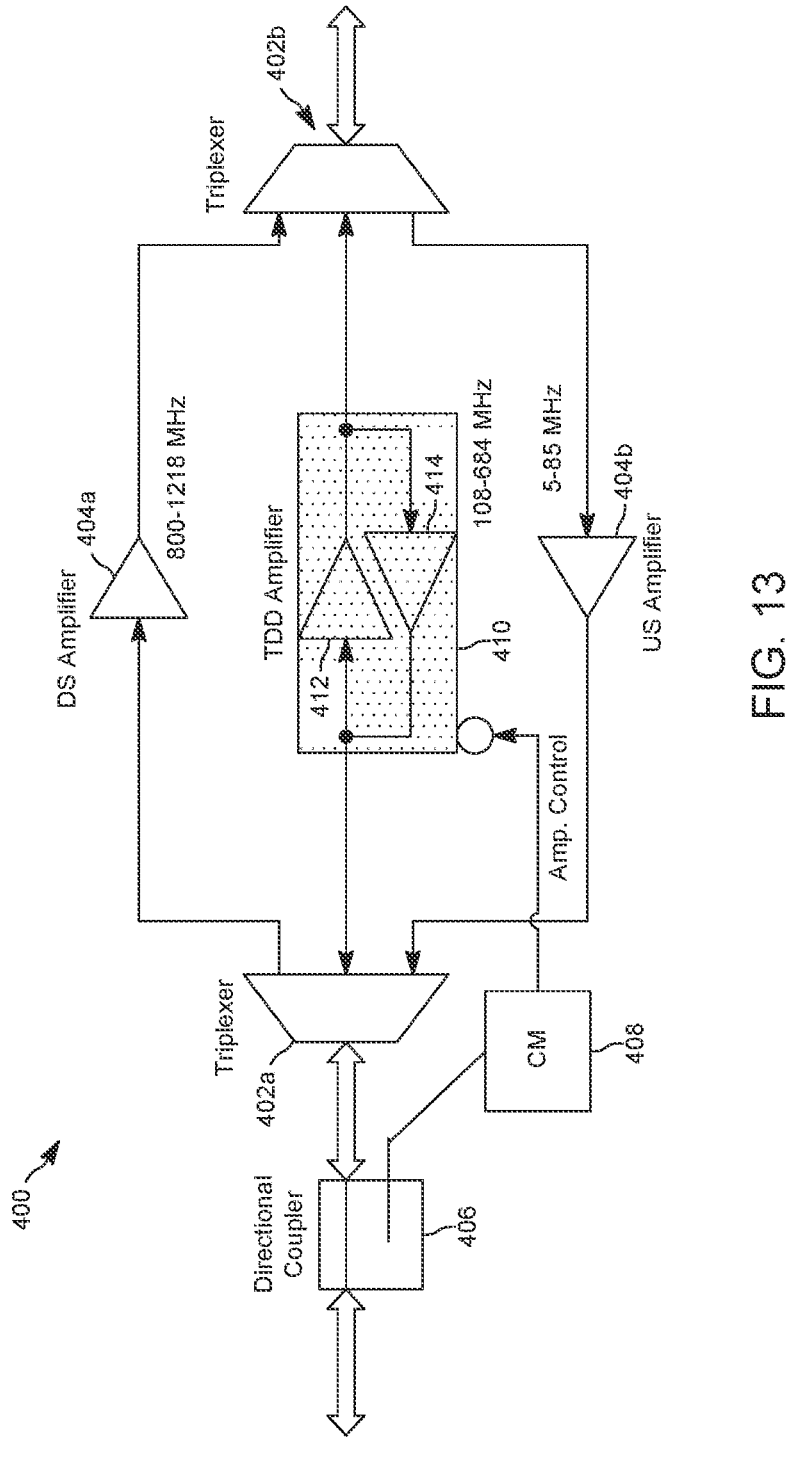

FIG. 13 shows one embodiment of a soft-duplex amplifier having a triplexer.

Figure 14:
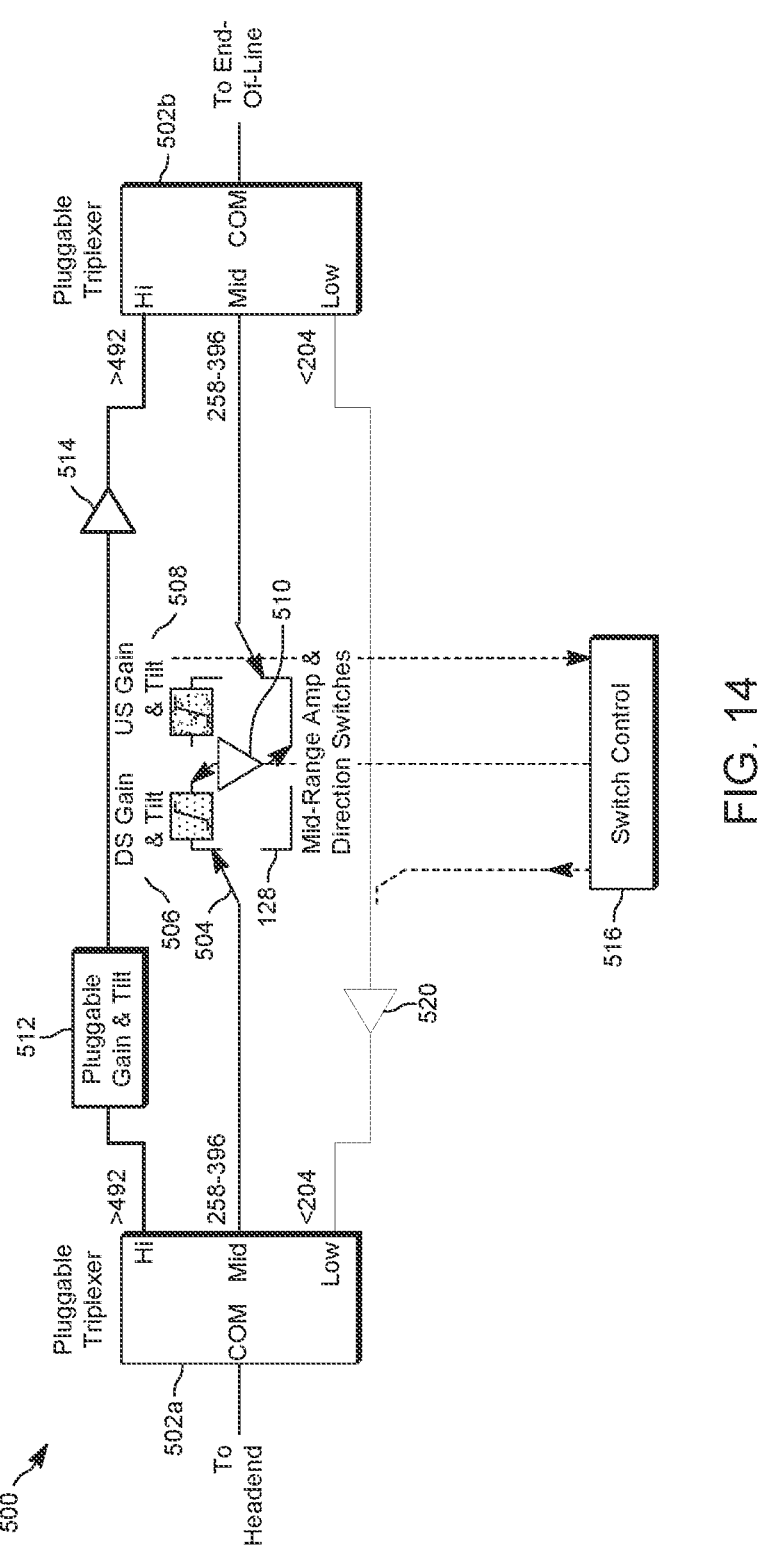
Figure 15:
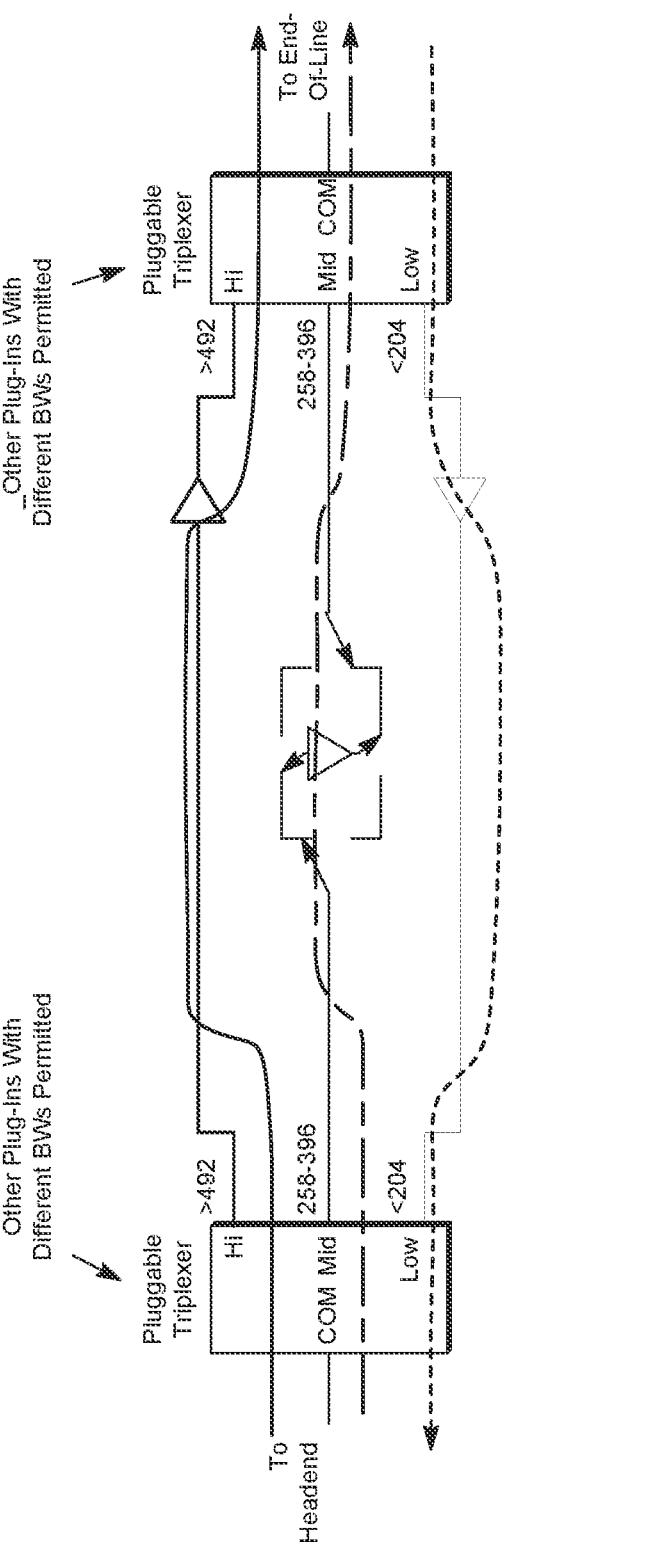

FIG. 14 shows a second embodiment of a soft-duplex amplifier having a triplexer and pluggable gain and tilt modules in the mid-band amplifier block FIG. 15 shows switch positions of the amplifiers of FIGS. 13 and 14 when the mid band is used in the downstream direction.

Figure 16:
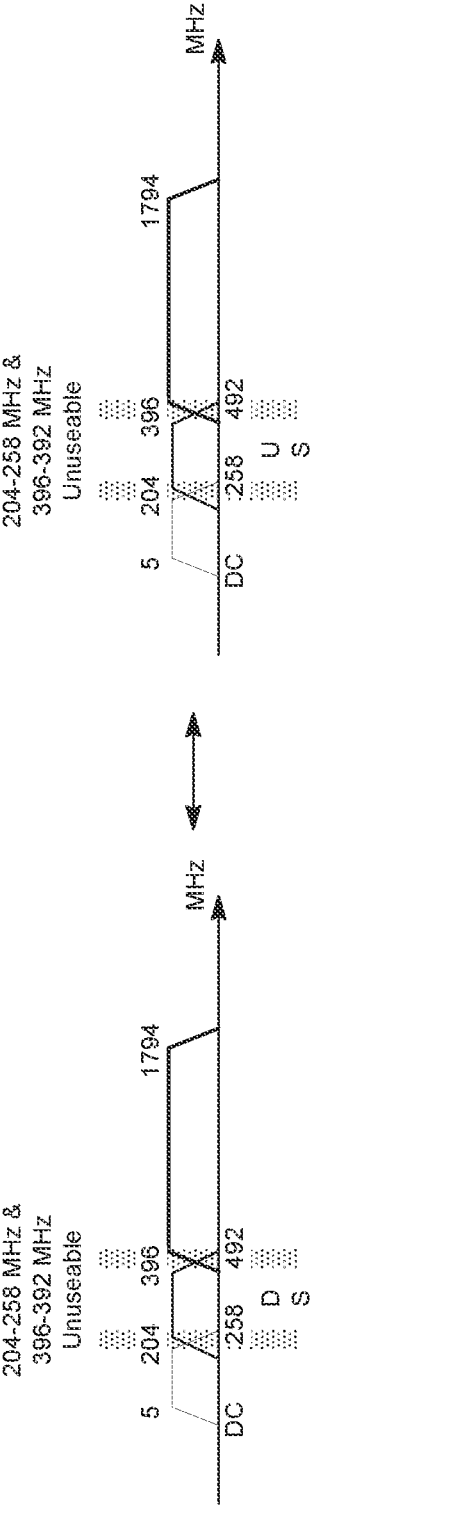

FIG. 16 shows dedicated upstream and downstream bands of 5-204 MHz and 492-1794 MHz, respectively for the amplifiers of FIGS. 13 and 14.

Figure 17:
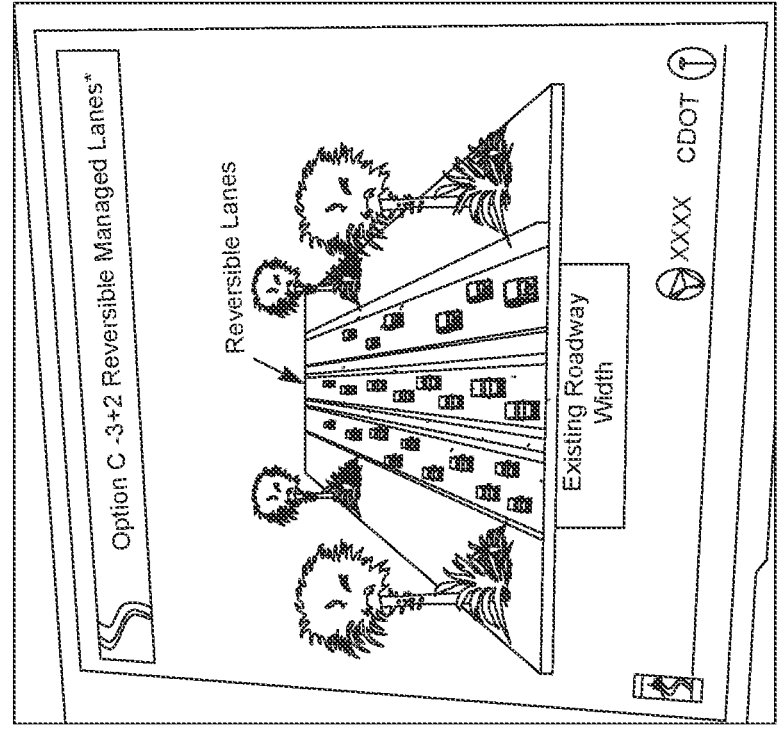
Figure 17:
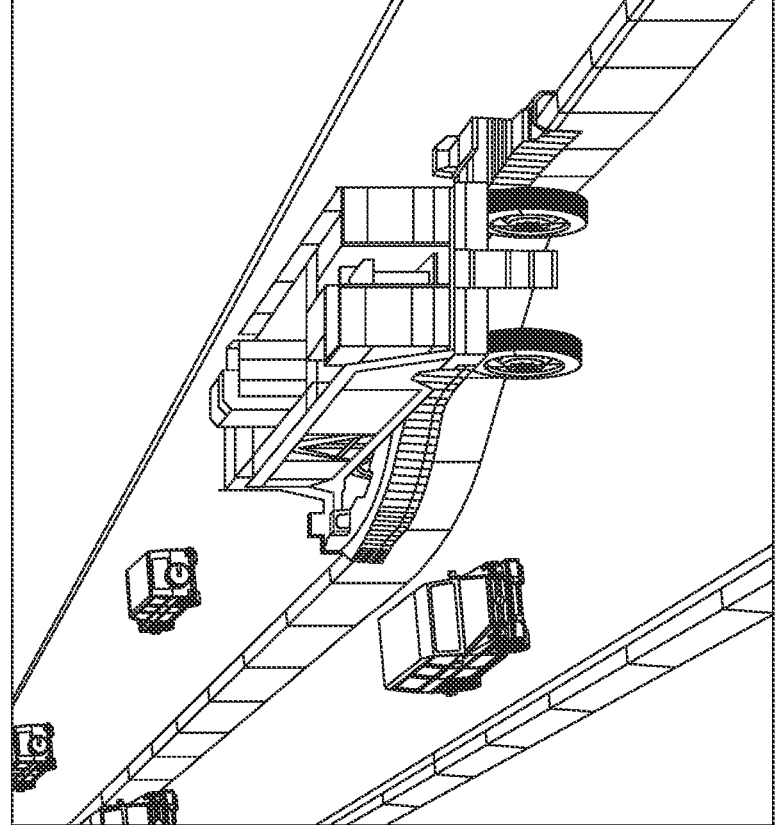

FIG. 17 depicts a highway traffic management schemes using center lanes that switch directions mid-day as an analogy to the operation of the amplifiers of FIGS. 13 and 14.

4

Figure 18:
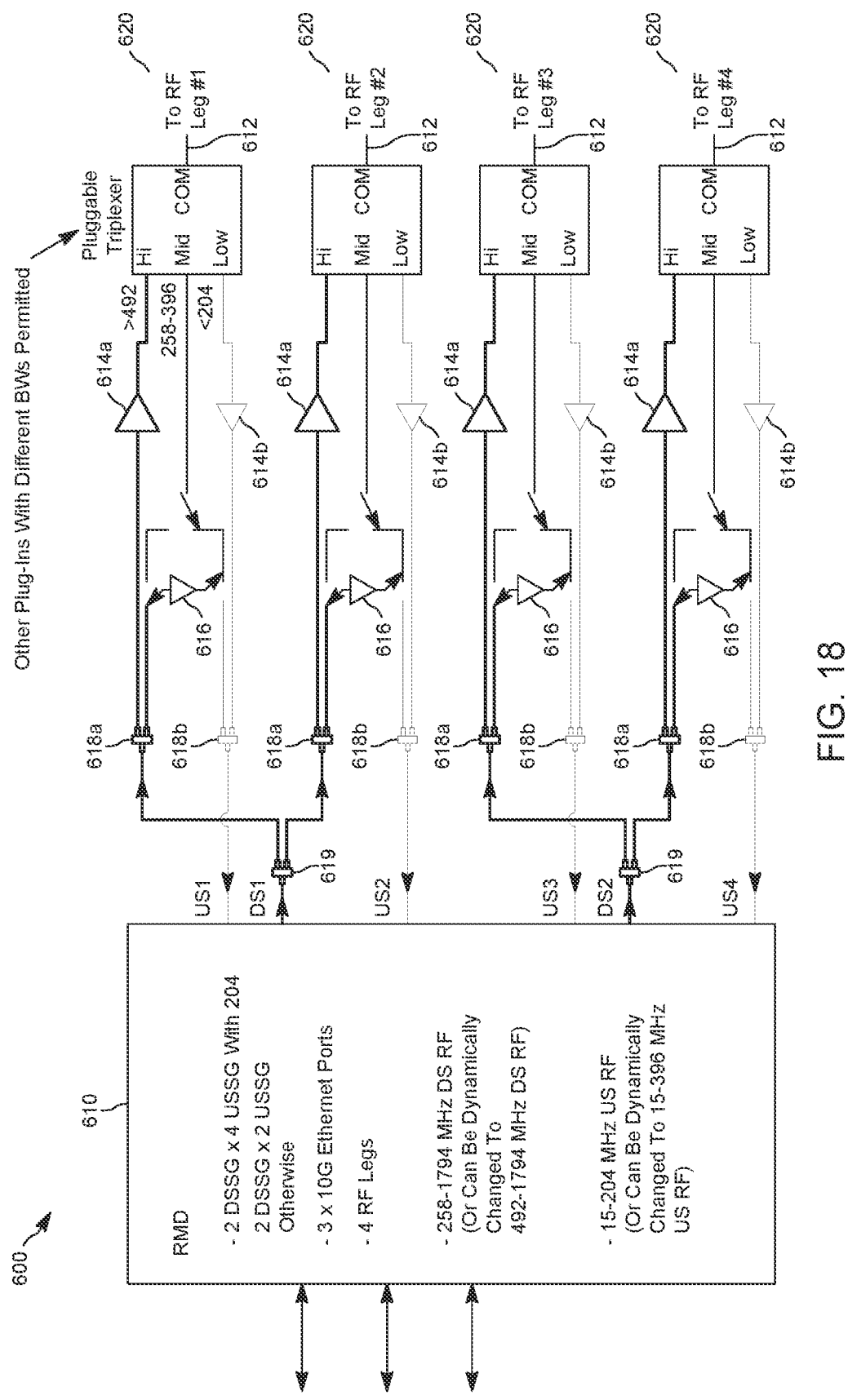

FIG. 18 shows a node implementation of the amplifiers of FIGS. 13 and 14.

Figure 19:
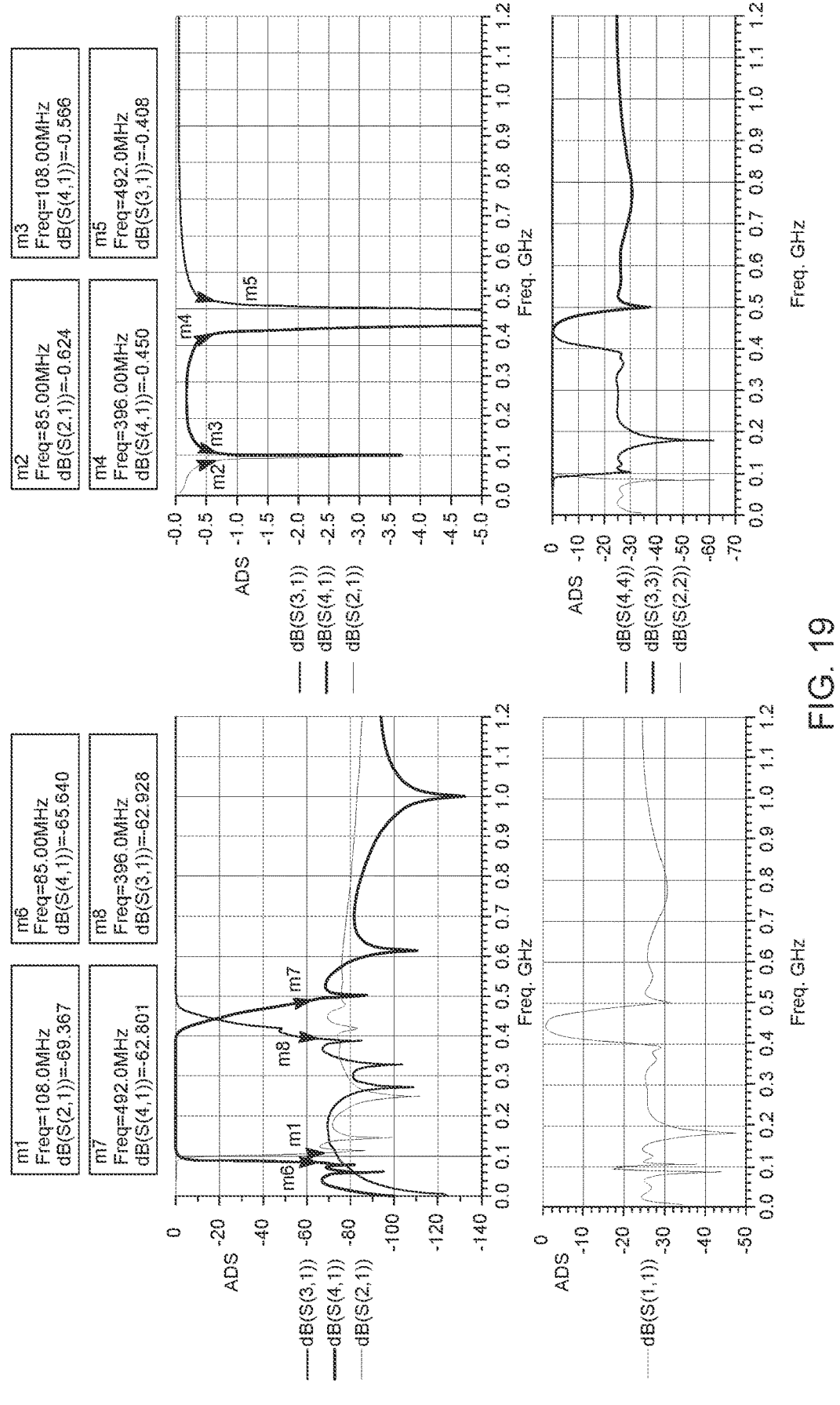

FIG. 19 shows model S-parameter plots of a triplexer implementation for 5-85/108-396/492-1218 splits.

Figure 20:
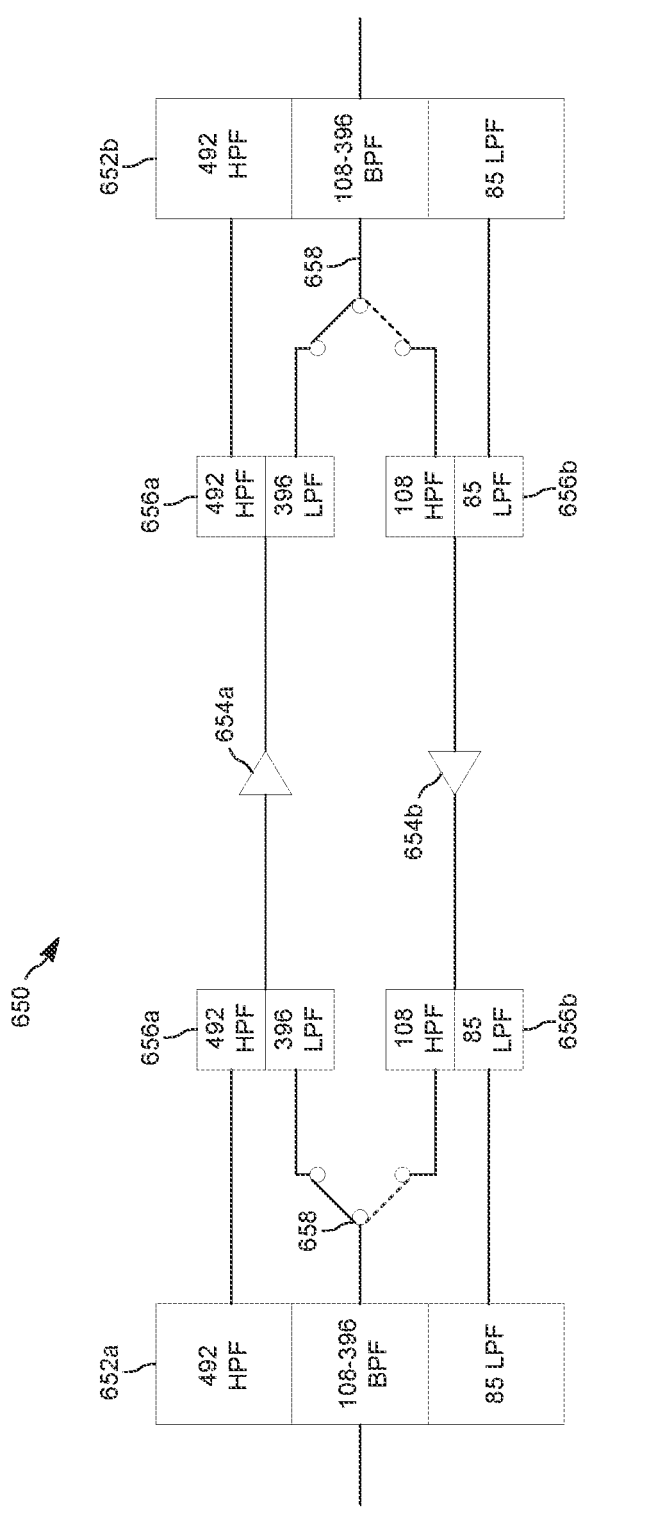

FIG. 20 shows an alternate embodiment to the design of FIGS. 13 and 14.

Figure 21:
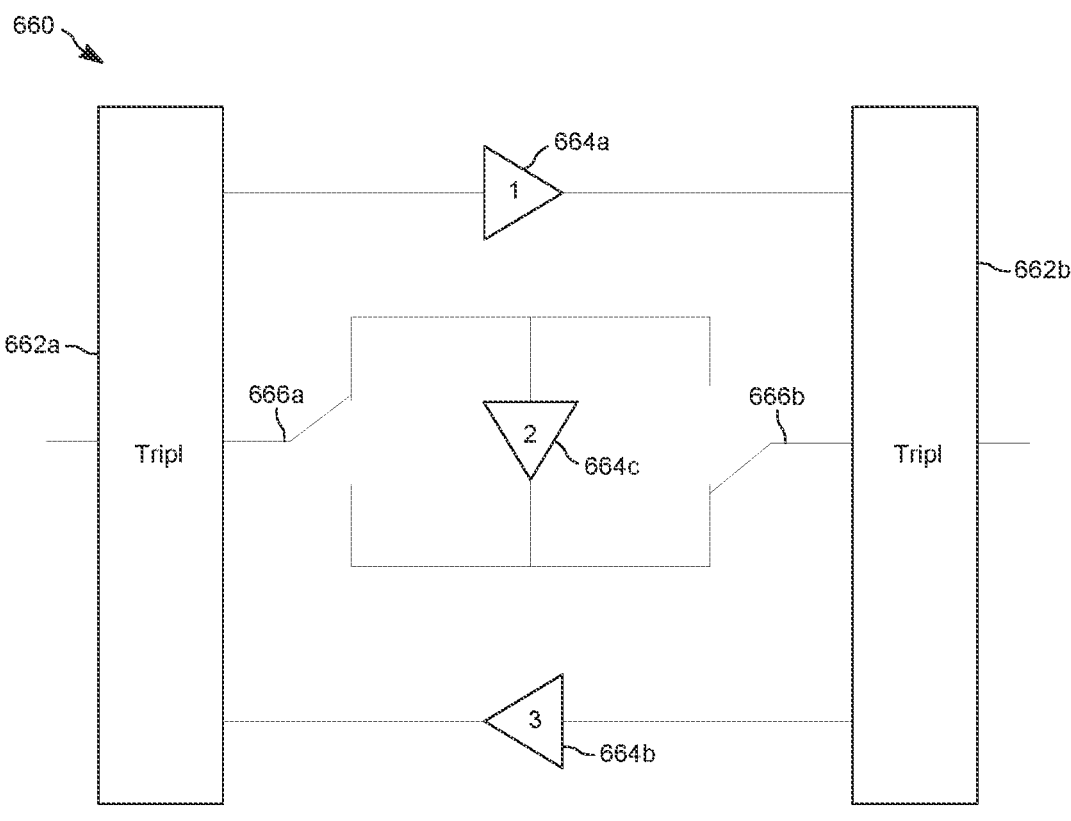

FIG. 21 shows a second alternate embodiment to the design of FIGS. 13 and 14.

Figure 22:
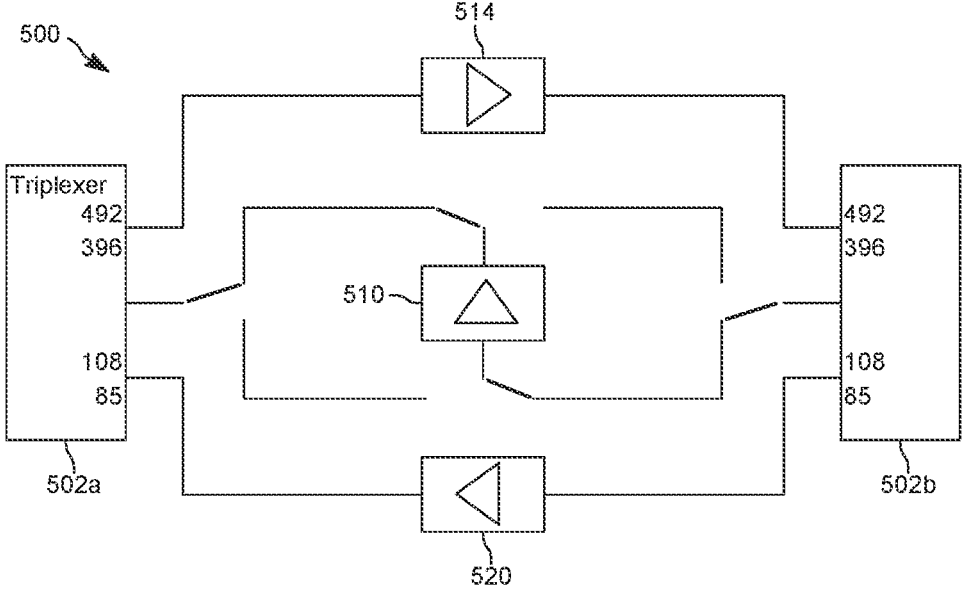

FIG. 22 shows a simplified version of the amplifier of FIG. 14.

Figure 23:
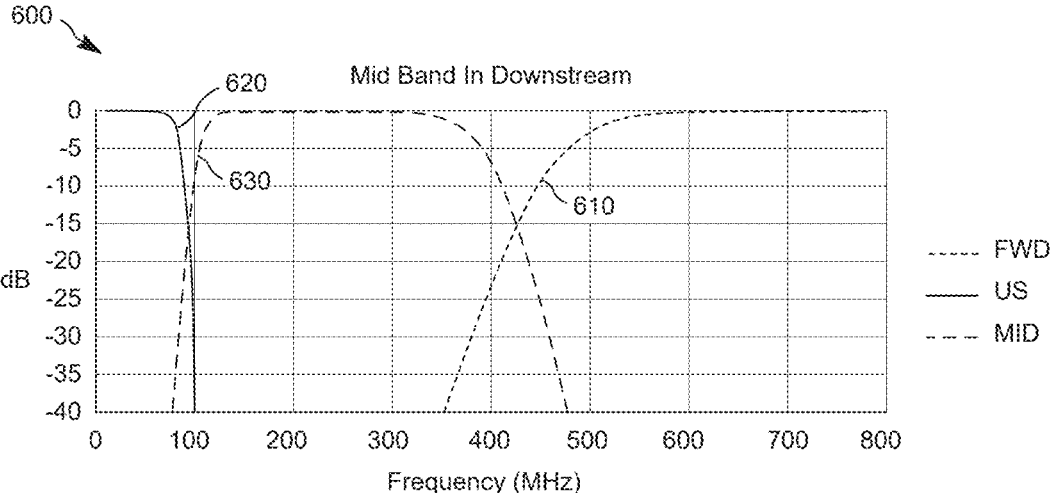

FIG. 23 shows the filter response of the amplifier of FIG. 22 when the mid-band is set to the downstream direction.

Figure 24:
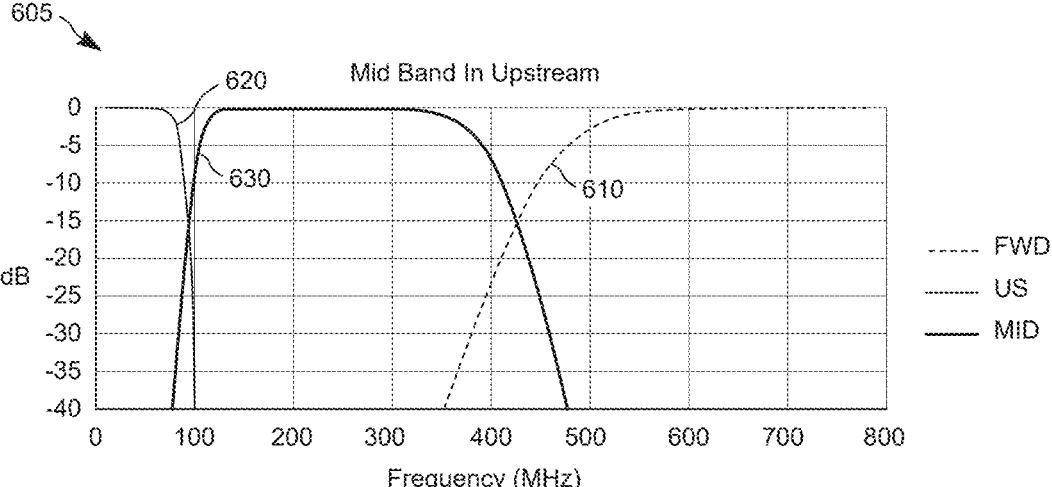

FIG. 24 shows the filter response of the amplifier of FIG. 22 when the mid-band is set to the upstream direction.

Figure 25:
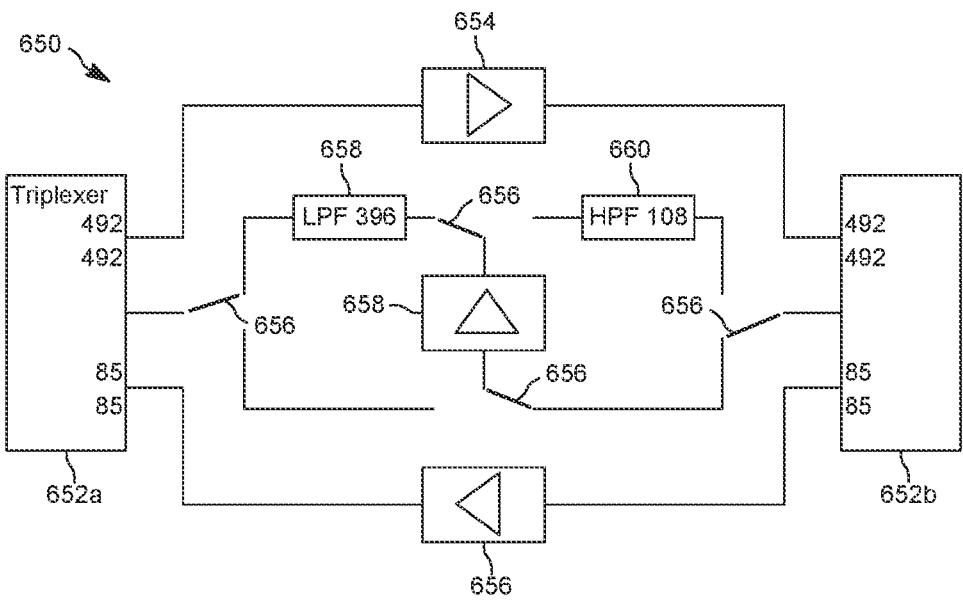

FIG. 25 shows an alternate embodiment of the disclosed amplifiers/nodes that places filters in the path of the mid-band amplifier block.

Figure 26:
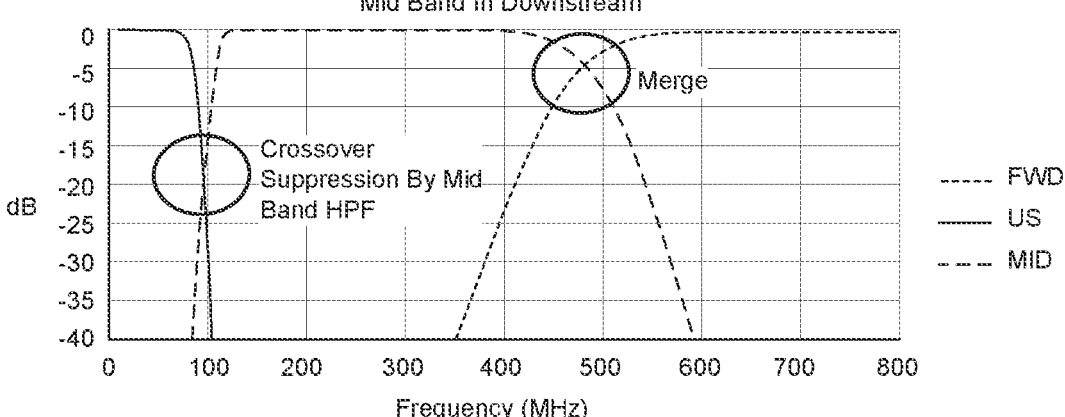
Figure 26:
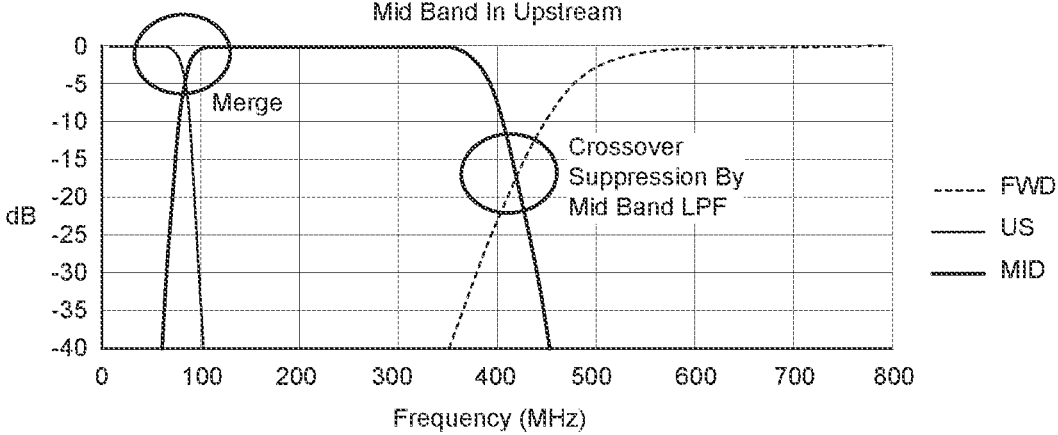

FIG. 26 shows the frequency responses of the triplexers and filters in the embodiment of FIG. 25.

Figure 27:
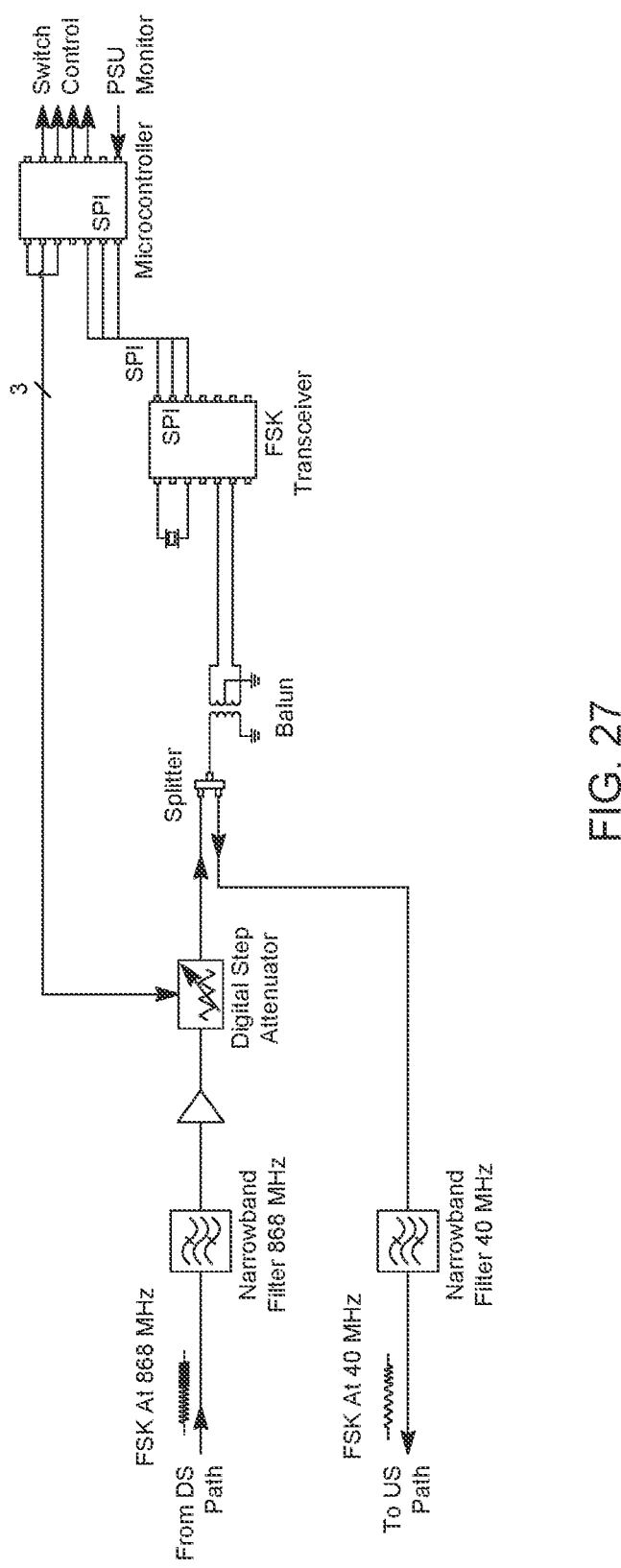

FIG. 27 shows an exemplary transceiver/microcontroller circuit suitable for implementing signaling that causes the mid-band of the disclosed amplifiers/nodes to switch between the upstream/downstream directions.

DETAILED DESCRIPTION

As already noted, the DOCSIS specification has historically used different frequency bands for upstream and downstream data traffic. Even though multiple cable modems in a given service group share the same network resources, the upstream and downstream traffic are completely isolated.

In FDX systems, however, interference between the bi-directional transmissions must be mitigated for the intended downstream signals to be properly received by cable modems (CMs) within an Interference Group. In a point-to-multi-point system, where multiple CMs are connected to the same Cable Modem Termination System (CMTS) port, when one CM transmits upstream to the CMTS, the upstream signal may leak through the cable plant and interfere with reception of downstream signals at the same frequency received by other cable modems within an Interference Group. Because the source of the interference is unknown to all of the receiving CMs (except for one), techniques such as echo cancellation cannot be used at the CMs.

Figure 1:
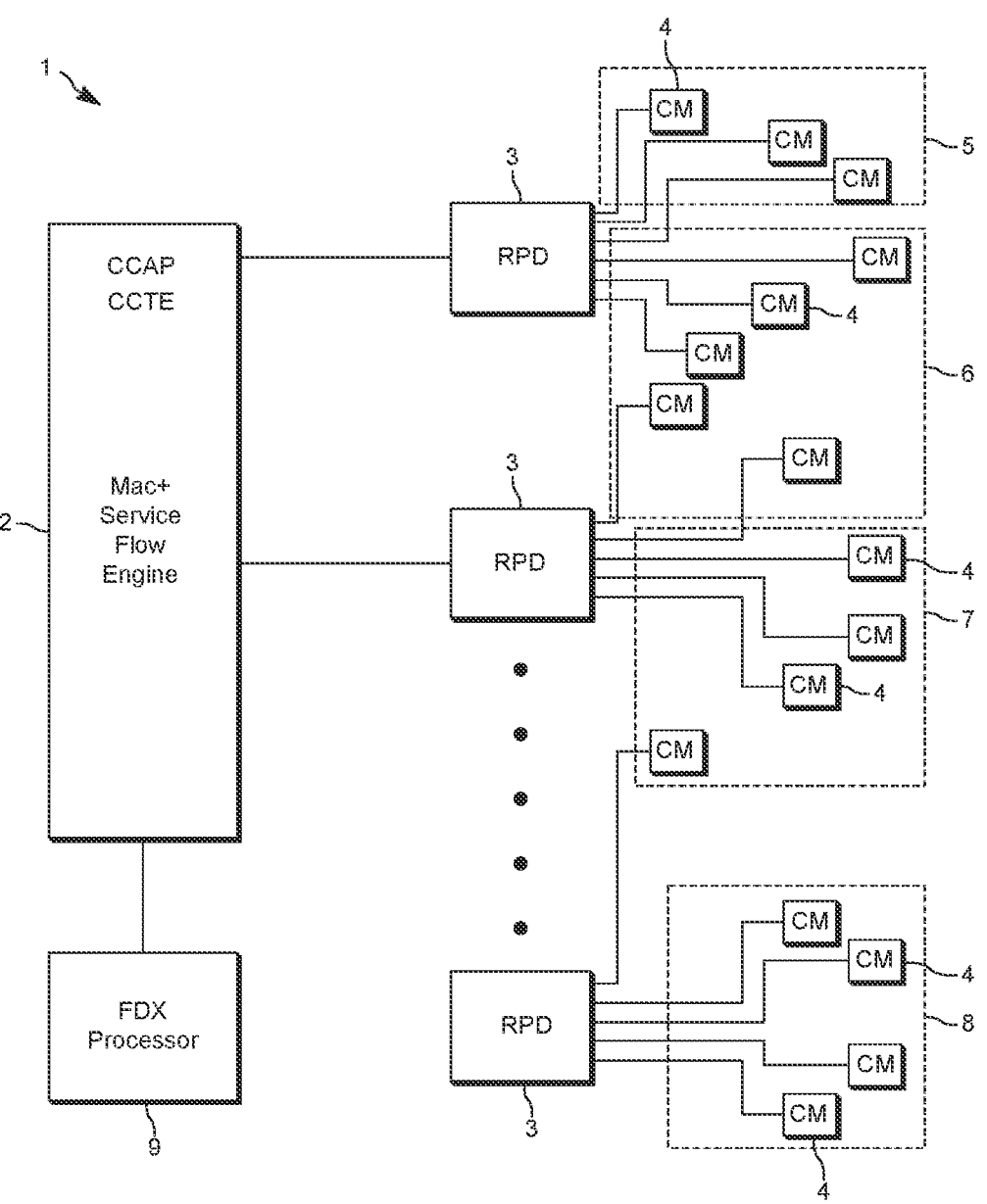
FIG. 1 shows an exemplary full duplex R-PHY CATV architecture where many individual cable modems, each

Since RF signals from a modem transmitting data in the upstream direction can interfere with other modems within an Interference Group that receive data in the downstream direction, such interference can be minimized by identifying the modems within each Interference Group and organizing them into a logical construct within the CMTS. This logical construct is actually called an "Interference Group". Referring to FIG. 1, for example, a CATV transmission architecture 1 may include a distributed CCAP system consisting of a CCAP Core 2 at a head end with associated Remote PHY Devices (RPD) 3 that are connected to a plurality of cable modems 4 via a branched transmission network. The architecture of FIG. 1 is shown as an R-PHY system where the CMTS MAC operates in the CCAP core 2 in the Head End while Remote Physical Devices (RPDs) 3 are located in the Fiber Node. An alternate system may use a traditional integrated CCAP (I-CCAP) operating fully in a head end, connected to the cable modems 4 via a plurality of nodes/amplifiers. Another alternative system may use a Remote MACPHY Device (RMD) in a fiber node connected to the cable modems 4 via a plurality of amplifiers.

Preferably, to facilitate FDX transmission, the cable modems are organized into Interference Groups (IGs) 5, 6, 7, 8, etc. As the name indicates, an IG is a collection or group of modems where the upstream transmission of one or more of the modems in the IG will unacceptably interfere with downstream reception of other modems in the IG, but will not unacceptably interfere with downstream transmissions of cable modems in any other IG. Identifying these IGs and using the IG groups to appropriately schedule downstream and upstream transmissions is crucial to achieving high throughput in FDX systems by allowing the CCAP to schedule downstream transmissions to all cable modems in an IG at a time when no cable modem in that IG is transmitting in the upstream direction. To this end, to identify cable modems that interfere with each other and group them into IG's a sounding technique is used to measure the interference caused to other cable modems in a network by the upstream transmissions a particular cable modem. During sounding, a given modem sends out pilot signals in the upstream while the rest of the modems in the service group measure their downstream modulation error rate (RxMER). This process is repeated by different transmitting modems resulting in a matrix showing the co-channel interference for the whole service group. Sounding data may be collected from a large number of service groups from several CCAP cores, and the collected data may be processed in a centralized processor 9 shown in FIG. 1 to organize the cable modems into respective IGs.

FIGS. 2A and 2B illustrate an IG elongation problem encountered in a node+X architecture, where at least one RF amplifier 10 is located downstream from the last node 12 towards the taps to the group of cable modems serviced by the last node. FIG. 2A generally illustrates a theoretical organization of IGs 14, 16, 18, and 20 that would have been expected to be produced by the sounding procedure described in the preceding paragraph where a number of different IGs would be produced, thus allowing simultaneous upstream transmissions from several different IGs. FIG. 2B, however, shows what actually occurs in a Node+X architecture, i.e. the amplifier 10 causes a single, very large IG to result from almost all the taps (cable modems) to either side of it, negating the effectiveness of FDX and forcing upstream transmissions to essentially utilize frequency division duplex (FDD) operation.

Although the elongation problem shown in FIGS. 2A and 2B could be overcome by eliminating all amplifiers downstream of the last node, i.e. migrating to a Node+0 architecture, this is often an impractical solution. For a cost perspective, migrating to a Node+0 architecture starting from, say a Node+3 architecture already incurs about 85% of the cost of simply delivering Fiber-to-the-Home, where full duplex transmission is supported without the need for dividing subscribers into Interference Groups. Thus, any provider contemplating the cost of a Node+0 architecture may instead move directly to FTTH unless another alternative is proposed.

To address this problem, a special operational mode of traditional FDX, referred to as "Soft-FDX" or "Soft-FDD" is proposed, which emulates FDX operation in a cascaded Node+X architecture. The disclosed "Soft-FDD" systems and methods are based on operating each of the node radio frequency (RF) legs in an FDD mode, such that the upstream and downstream spectra do not overlap, as in standard HFC networks. The term "soft'" refers to the ability to change the location of the upstream/downstream split using software. Soft-FDD enables relatively high upstream speeds, which are occasionally demanded by users, without permanently locking the spectrum into the upstream direction, which can severely affect the valuable downstream spectrum used to offer many services including video and high download speeds which are demanded more frequently than upstream services. The various RF legs on a single node can have different upstream/downstream split configurations, leading to overlapping upstream and downstream spectra at the node/MAC level, which translates to an FDX type operation at the node/MAC level. In other words, the Soft-FDD mode is equivalent to a traditional FDX mode with an IG size of all CMs on one RF leg.

Soft-FDD implementations can be either static or dynamic. Static Soft-FDD refers to the case where the upstream/downstream split location does not change without operator-initiated configuration changes, which causes the split to stay in a given configuration for months, or even years. On the other hand, dynamic Soft-FDD refers to the case where the upstream/downstream split location changes in real time based on traffic demand (on the order of milliseconds or seconds). For instance, in the dynamic Soft-FDD mode, when there is a need for more upstream spectrum as a result of say a subscriber-initiated upstream speed test, the upstream/downstream split changes automatically to accommodate the needed upstream bandwidth, and when the need for the added upstream spectrum goes way, the split changes back to reclaim the valuable downstream spectrum. Both static and dynamic Soft-FDD can be implemented using special assignment of FDX RBA messages. Several potential techniques for communicating the required Upstream and Downstream spectra are described here, while more methods are possible.

In the first approach, the amplifier circuit would include a CM to monitor and receive the FDX RBA messages sent by the DOCSIS MAC. The CM can receive the FDX RBA messages for the Interference Group to which it belongs and use the information to effect appropriate changes on the switches selecting the Upstream and Downstream spectra settings. In the second approach, the amplifier circuit would include a CM to monitor and receive normal IP messages sent by an IP-based controller in the head-end or node (which communicates with the DOCSIS MAC). The CM can receive the IP RBA messages and use the information to affect appropriate changes on the switches selecting the Upstream and Downstream spectra settings. In the third approach, the amplifier circuit would include a simple receiver circuit to monitor and receive protocol messages on a dedicated narrow-band channel. These protocol messages could be communicated using simple modulation techniques such as OOK or FSK signaling. These protocol messages could be sent by a controller in the head-end or node (which communicates with the DOCSIS MAC). The receiver circuit can receive the protocol messages and use the information to effect appropriate changes on the switches selecting the Upstream and Downstream spectra settings. In another possible implementation, a simple receiver circuit could be used to analyze the presence &/or absence of pilot tones and use that information to configure the amplifier.

Preferably, the disclosed systems and methods for using FDX nodes, amplifiers, and modem technologies for cascaded (i.e., N+x) FDD networks via a Soft-FDD is compliant with the DOCSIS FDX specifications.

FIGS. 3A and 3B show an exemplary architecture 100 implementing a soft duplex system where a node 102 services upstream and downstream communications to a service group comprising a number of cable modems (not shown) via a branched network 104 of amplifiers 106. The network of amplifiers is arranged in a cascading hierarchy where the amplifier at a first level following the node (e.g. amplifier "1" shown in FIGS. 3A and 3B) feeds a plurality of amplifiers (e.g. amplifiers 2*b* and 2*b*) at the next level of the hierarchy, and so forth. As indicated previously, to facilitate a soft duplex architecture, each amplifier 106 may include at least two diplexers (or a single triplexer) to implement different splits between upstream and downstream transmissions, e.g. one configuration that implements a low upstream/downstream split at 85/108 MHz (meaning that frequencies below 85 MHz are dedicated to upstream transmissions and frequencies above 108 MHz are dedicated to downstream transmissions, the intervening bandwidth being a guardband), and a second configuration that implements a high upstream/downstream split at 684 Mhz/834 MHz. As can be seen in FIG. 3C, when the service group connected to the node 102 is operating in upstream mode, the amplifiers 106 are switched to use the "high diplexer" setting, which means that transmissions up to 684 MHz are reserved for upstream transmissions, while downstream transmissions are sent in the 834-1218 MHz spectrum. Alternately, when the service group connected to the node 102 is operating in downstream mode, the amplifiers 106 are switched to use the "low diplexer" setting, which means that transmissions up to 85 MHz are reserved for upstream transmissions, while downstream transmissions are sent in the 108-1218 MHz spectrum.

FIGS. 4A-4C each show respective embodiments of node and amplifiers capable of implementing the architecture 100 of FIGS. 3A and 3B. FIG. 4A, for example, shows a remote node 110 illustrated as a Remote MACPHY device (RMD) that services up to four upstream service groups and implements a selectable 85/684 MHz upstream/downstream split—i.e. a node that can implement a first split between the upstream and downstream directions at 85 MHz, but when more bandwidth is needed in the upstream direction, can change that split to 684 MHz. Specifically, the node 110 may have four RF legs that each relay upstream/downstream content to a respective service group through a respective pluggable triplexer 112, each capable of separating signals into three bands: a high band greater than 834 MHz, a low band of less than 85 MHz, and a mid-band between 108 MHz and 684 MHz. The node 110 may also include an array of upstream and downstream amplifiers 114*a* and 114*b*, respectively, an array of double throw switches/amplifiers 116, an array of eight splitters 118*a* and combiners 118*b*, and another array of two splitters 119.

These elements are arranged so that a downstream signal from each of two ports DS1 and DS2 of the node 110 is first split in two by one of the splitters 119, each output of the splitters 119 then split again by a respective one of four of the splitters 118. A first output of these four splitters 118*a* is connected to a respective "high" port of a triplexer 112 via an amplifier 114*a*, and the second output of the four splitters 118 is connected to a respective double throw switch/amplifier 116, the operation of which will be explained below. Conversely, in the upstream direction, each upstream port US1 to US4 of the RMD is connected to a respective one of the other four combiners 118*b*, where a first input of each of these four combiners is connected to the "low" port of a respective triplexer 112 via an amplifier 114*b*, and the other input connected to a respective double throw switch/amplifier 116.

In operation, the node 110 as shown in FIG. 4A will constantly transmit downstream data above 834 MHz via splitters 119, 118*a*, an amplifier 114*a* and the triplexer 112 high port. The node 110 is constantly receiving upstream data below 85 MHz via the triplexer 112 low port, an amplifier 114*b* and combiner 118*b*. The mid-band spectrum can be dynamically be changed to the upstream or downstream direction by appropriately configuring the switch/amplifier 116. The switch/amplifier 116 for a given US port may be configured independent of the other switch/amplifiers 116. Each port of node 110 is capable of operating between a first mode as shown in FIG. 4A where downstream signals are provided from each downstream port DS 1, DS 2 to the mid-port of a respective pair of the four triplexers 112 due to the position of the double throw switch/amplifier 116. In this mode, the triplexer 112 mid-port is providing downstream signals in 108-684 MHz and the upstream signals, 5-85 MHz, from the only the low port of each of the triplexer 112 is routed to US 1 to US 4 ports of the node 110. In a second mode of operation, however, the double throw switches/amplifiers 116 are actuated to instead connect the mid-port of a triplexer 112 to its respective upstream port US 1 to US 4 via combiner 118*b* and disconnect the downstream signals from the mid port of each triplexer 112. In this second mode of operation, both the low port and mid port of the triplexer 112 is connected to a respective upstream port US 1 to US 4 of the node 110, while only the high port of the triplexer 112 receives a downstream signal.

Those of ordinary skill in the art will appreciate that other configurations of splitters/amplifiers may achieve the same functionality as shown in FIG. 4A. For example, instead of having a downstream port of the RMD 110 connected to a first 1×2 splitter 119 that in turn feeds two 1×2 splitters 118, these three 1×2 splitters may simply be replaced by a single 1×4 splitter. Similarly, other pluggable triplexers implementing different splits, and/or combinations of diplexers may be utilized instead.

FIG. 4B shows a Line Extender amplifier circuit 120 that is similarly configured to implement a soft-duplex system in which downstream and upstream signals share an intermediate frequency band in a time-division duplexed manner. Specifically, the amplifier circuit 120 includes two pluggable triplexers 122*a* and 122*b*, each with a high port that passes downstream frequencies greater than or equal to 834 MHz, a low port that passes upstream frequencies less than or equal to 85 MHz, and a mid-port that passes shared upstream/downstream frequencies between 108 and 684 MHz. In the downstream direction, an input from the high port of triplexer 122*a* is connected to the high port of triplexer 122*b* via an intervening gain/tilt module 124*a* that preliminarily adjusts the gain of the downstream signal as a function of frequency to compensate for line losses that also vary by frequency, so that the tilted signal can be amplified by amplifier 124*b*. Similarly, the upstream signal from the low port of triplexer 122*b* is connected to the low port of triplexer 122*a* after the gain of the upstream signal is adjusted by amplifier 126. The upstream signal, being bandlimited to a small amount of spectrum will in ordinary cases need no tilt adjustments. The circuit 120 also includes a midrange double throw switch/amplifier module 128 which allows the mid-ports of the pluggable triplexers 122*a* and 122*b* to selectively alternate between passing upstream signals and downstream signals via the position of the switch. The line extender circuit 120 is suitable for applications when upstream and downstream soft duplex signals conveyed along a length of cable need to be amplified to compensate for line losses. Thus, if the triplexer 122*a* receives a soft duplex signal where the downstream signal occupies the mid-band of 108-684 MHz, then the switch/amplifier module 128*a* is set to the position shown in FIG. 4B. Alternatively, if the triplexer 122*b* receives a soft duplex signal where the upstream signal occupies the mid-band of 108-684 MHz, then the switch/amplifier module 128*a* is set to the position opposite what is shown in FIG. 4B. A switch control circuit 129 may be used to operate the switch/amplifier module 128*a*.

FIG. 4C shows an exemplary multi-port bridger amplifier circuit 130 by which a triplexer 132*a* connected to a northbound port that receives a downstream soft-duplex signal to be amplified, and also transmits an amplified soft-duplex upstream signal, is connected to multiple triplexers 132*b* at respective southbound ports that each receive an upstream soft duplex signal to be amplified and transmit an amplified downstream soft duplex signal. In the circuit 130, the high port of the triplexer 132*a*, which receives a downstream signal to amplified is connected to a pluggable gain/tilt module 134 which operates in the same manner as described with respect to FIG. 4B. The output of the gain/tilt module 134 is passed through splitter array 136*a* to feed the high ports of triplexers 132*b* after the tilted signal is further amplified as necessary by a respective amplifiers 138*a*. Thus, the downstream signal received at the high port of triplexer 132*a* is amplified and passed on through the high ports of all triplexers 132*b*. Similarly, the upstream signals received at the low port of each of the triplexers 132*b* are combined at combiner array 136*b*, amplified at amplifier 138*c*, and fed to the low port of the triplexer 132*a*.

The position of the double throw switch/amplifier 140 as controlled by switch control 142 determines whether the signals exchanged between the mid port of the triplexer 132*a* and the mid ports of the triplexers 132*b* are upstream signals or downstream signals, as described above with respect to FIGS. 4A and 4B. If the switch/amplifier 140 is in the position as shown in FIG. 4C, the downstream signal from triplexer 132*a* mid-port is amplified and fed to the mid-ports of the triplexers 132*b* via splitter/combiner network 136*b*, while if the switch/amplifier 140 is in the position opposite that shown in FIG. 4C, the upstream signals from triplexers 132*b* are combined by splitter/combiner network 136*b*, the combined signal is amplified, and then fed to the mid-port of the triplexer 132*a*. These two different modes of operation of the exemplary bridger amplifier circuit 130 shows the signal flows in FIGS. 4D and 4E, respectively.

Referring again to FIGS. 3A-3C, as can also be appreciated in this system, however, the entire service group of cable modems behaves as a single transmission group. In other words, so long as one cable modem in the service group is transmitting in the upstream direction using the shared soft duplex spectrum, 108-684 MHz, as seen in FIG. 3A, all amplifiers connected to the cable modems will be switched to the "high" diplexer setting where the triplexer mid-port is passing upstream signals. This means that during such time all other cable modems will also have their downstream transmissions bandwidth limited to the high band above 834 MHz, regardless of whether they also need the shared soft duplex spectrum to transmit in the upstream direction. Notably, this group behavior exists independently of how many interference groups exist with the service group associated with the node 102. For example, referring to FIG. 3A, the modem(s) connected to amplifier "4*a*" may be in a different interference group than the modem(s) connected to amplifier 4(*b*) and the mere fact that a modem connected to amplifier 4*b* is transmitting upstream and within the shared soft duplex spectrum itself does not inhibit the modems connected to amplifier 4*a* from receiving downstream transmissions due to noise from the upstream transmission. Instead, the modems connected to amplifier 4*a* are inhibited form receiving downstream transmissions because the shared soft duplex spectrum along the entire path from amplifier 4*b* to the node needs to be reserved for upstream transmissions so that a modem connected to amplifier 4*b* can send upstream data to the node 102. This is acceptable in the near term to enable high upstream burst rates, but does not address the longer-term issue of increased system capacity.

As an alternative to the dynamic soft-duplex architecture shown in FIGS. 3A and 3B, it is possible to implement extended spectrum (e.g., a 1.8/3.0 GHz plant) to increase system capacity. Upstream bandwidth is increased by moving the upstream split higher (e.g., 300-684 MHz), which then pushes downstream usage into the higher frequencies. However, this approach also involves a significant overhaul of the Hybrid Fiber Coax (HFC) plant including replacement of passive taps in addition to active amplifiers. Some typical results of what might be achieved in the home using existing taps and hardlines between taps are shown in FIGS. 10A-10H. These figures, which will be discussed in more detail later in this specification, show that although HFC with 1-GHz taps might be pushed to support 1.2 GHz DOCSIS 3.1 (D3.1) systems, there appears to be minimal bandwidth available to the home above the D3.1 top frequency of 1218 MHz for N+x plants.

Another issue with the extended spectrum approach discussed in the preceding paragraph is that for the foreseeable future there may only be a limited number of 1.8+ GHz-capable cable modems, set-top boxes (STBs) or other consumer premises equipment (CPE) devices in the HFC plant. The majority of the installed base will be existing CPE, including legacy STB (to 870 MHz), DOCSIS 3.0 (to 1002 MHz) and DOCSIS 3.1 (to 1218 MHz). Pushing the upstream split higher removes valuable downstream capacity from these existing technologies.

This concern also exists with respect to the dynamic soft duplex architecture of FIGS. 3A and 3B. While dynamic soft duplex allows upstream and downstream sharing of a limited FDX Band, this can only be shared with D3.1 OFDM channels. Thus, if the FDX Band is maximized for upstream capacity—e.g., 108-648 MHz, then all the older legacy DOCSIS 2.0/3.0 and STB equipment gets squeezed into the upper 834-1002 MHz range. As CPE migrates to higher D3.1 penetration, DOCSIS 3.1 OFDM channels will be squeezed since 1002-1218 MHz is the only dedicated downstream OFDM Bandwidth. The FDX band might be shared between downstream and upstream, but this will become problematic with the larger N+x service group sizes over time. Eventually there will be a need that will require the dynamic soft-FDD single transmission group to be segmented, which given existing technology will require an expensive node split and push fiber deeper into the HFC network.

Referring to FIG. 5A, one embodiment of the present disclosure may comprise a "mixed mode" dynamic soft duplex architecture 200 in which a fiber node provides upstream and downstream services to a plurality of customers (not shown) through a tree-and-branch network 204 having a plurality of "mixed mode" amplifiers 206. One or more of the "mixed mode" amplifiers in the network 204 preferably include at least one of the following characteristics. First, both its northbound, or Network-Side Interface (NSI) port, as well as each of its southbound or premise side ports have individual switching mechanisms by which the port may determine whether the shared soft-duplex band is used for upstream or downstream transmissions. Second, each southbound port of a mixed mode amplifier is preferably switchable independently of other southbound ports or the northbound port. Third, each mixed mode amplifier is preferably capable of down-converting an overlay portion at the upper part downstream signal it receives at its NSI to the shared soft-duplex frequency band. Fourth, each mixed mode amplifier is preferably capable of being operated or switched independently of other amplifiers in the architecture 200. With the system as just described, any amplifier may have some RF ports select the soft duplex band for upstream transmission while other ports of the same amplifier select the soft duplex band for downstream transmission, and these selections may be made independently of other amplifiers.

Preferably, the fiber node 202 may be capable of providing the tree-and-branch network 204 of mixed mode amplifiers with an overlay above the upper part of the spectrum reserved for downstream spectrum. That overlay preferably includes the part of the downstream content that would ordinarily be sent in the shared soft-duplex band, but is instead put at a frequency in the higher spectrum above the ordinary downstream frequency channel. In some embodiments, the node 202 may be capable of generating a portion of the downstream signal it receives to provide that overlay portion, but in other embodiments it may simply receive a signal with the overlay portion at the upper end of the downstream spectrum and be capable of passing that signal on to the network 204.

In this manner, each "mixed mode" amplifier is preferably capable of down-converting the overlay portion of the downstream signal received to the shared soft duplex spectrum at selected southbound ports, while other southbound ports are configured to transmit upstream signals in the shared spectrum. For example, when an upstream signal is present at the lower port of the amplifier 4b, as shown in FIG. 5A, that amplifier may be configured to down-convert the received overlay spectrum to the shared soft-duplex band only at the upper port, but not the lower port, and its NSI port may be configured to dedicate the shared soft-duplex band to upstream traffic. Similarly, Amplifier 3A may be configured to behave similarly, but those of ordinary skill in the art will appreciate that, because the top port of amplifier 3a is in the DS direction (i.e. it has already performed a down-conversion (since amplifier 4a is downstream only and not using the shared soft duplex band for an upstream transmission), then amplifier 4a may simply have all its ports configured in a condition where the shared band is reserved for downstream content) while the lower port of amplifier 3a is in the upstream direction receiving upstream signals in the shared spectrum from amplifier 4b.

The same is true for amplifiers 2a and amplifier 1—i.e., their NSI port and their top southbound port may be configured to dedicate the shared soft-duplex band to upstream traffic, while it down-converts the overlay portion to the shared soft duplex band at its lower port, which allows all amplifiers connected directly or indirectly to their lower southbound ports to simply be configured in a condition where the shared band is reserved for downstream content. The mixed mode architecture 200 therefore allows the node 202 to serve more granularly-segmented transmission or interference groups, such that more customers may receive the benefit of greater downstream capacity. Some modems may be receiving downstream data in the shared band simultaneously with other modems transmitting upstream data in the shared band, which starts to emulate a true FDX system.

As can be easily appreciated from FIG. 5A, when all ports of an amplifier are in upstream mode or downstream mode, the amplifier behaves as a traditional dynamic soft duplex system as shown in FIGS. 3A and 3B. Mixed mode operation occurs when one or more ports are in upstream mode, while another one or more ports are in downstream mode. In any "mixed mode amplifier" the NSI port should be in upstream mode whenever any southbound port is in the upstream mode so the upstream signals can be passed up to the node. In some embodiments, a communications link to each of the mixed mode amplifiers indicates which mode to use for each port in the amplifier. Alternatively, other embodiments may utilize a communications link that only instructs the operation of the southbound ports, and internal control mechanisms (e.g., logic circuitry) operate the northbound port based on the mode of operation of the southbound ports. Furthermore, those of ordinary skill in the art will appreciate that the architecture of FIGS. 5A to 5C may encompass other upstream/downstream splits, and/or be extended to multiple shared bands.

FIGS. 5B and 5C respectively show the spectrum for upstream and downstream ports of a mixed mode amplifier in the soft duplex implementation of FIG. 5A. Specifically, as seen in FIG. 5B, when a port of a mixed mode amplifier is in upstream mode, the upstream bandwidth occupies the spectrum between 5 and 684 MHz, while the downstream bandwidth occupies the spectrum above 834 MHz, with a guardband from 684-834 MHz. Conversely, as seen in FIG. 5C when a port of a mixed mode amplifier is in downstream mode, the upstream bandwidth occupies a spectrum between 5 and 85 MHz while the downstream bandwidth occupies the spectrum above 108 MHz, with a guardband between 85-108 MHz.

In traditional dynamic soft duplex systems with one amplifier in upstream mode, all amplifiers in the tree—and branch topology will also operate in upstream mode, preventing any connected customers from receiving downstream content in the affected shared spectrum. With mixed mode operation, however, a certain percentage of RF segments to customers will still receive downstream content in the shared soft duplex band while other segments are in upstream mode. As shown in FIG. 6, the percentage of RF segments continuing to receive downstream content when any one segment to one of the terminal amplifiers in the network is switched to upstream mode increases with the number of southbound RF ports to the amplifier and the cascade length. For example, an N+3 system with two ports per amplifier has 15 RF segments, of which 11 (73%) will still receive downstream content. Notably, for all but one of the examples shown in FIG. 6, more than 50% of the RF segments still receive downstream content in the shared soft duplex band when using mixed mode amplifiers.

FIG. 7 shows an exemplary circuit 210 that implements the functionality of a mixed mode bridger amplifier as described above. Though FIG. 7 shows a bridger amplifier design to illustrate a mixed mode amplifier, those of ordinary skill in the art will readily appreciate that the switching circuitry shown may easily be adapted to other types of amplifiers or devices, such as line extended amplifier or a fiber node. The bridger amplifier 210 may preferably include a pluggable triplexer 212 having a northbound port 213 that receives a downstream signal from a head end and sends upstream signals to the head end, and may also preferably include a plurality of pluggable triplexers 214a . . . 214n at each of a plurality of southbound ports 215a . . . 215n of the amplifier 210 that each receive respective upstream signals sent towards a head end and send downstream signals from the head end towards the modems.

The triplexer 212 at the northbound port 213 of the amplifier 210 has its Hi output port connected to each Hi input port of each triplexer 214a . . . 214n by means of splitter/combiner network 218 and if desired, pluggable amplification/gain/tilt module 216. Similarly, the triplexer 212 has its Low input port connected to each Low output port of each triplexer 214a . . . 214n by means of splitter/combiner network 224. The triplexer 212 has its mid port connected to the mid port of each triplexer 214a . . . 214n by means of double throw switch 220, mid-range amplifier 225, and splitter/combiner network 222, where the double throw switch 220 determines whether the Mid "shared" port of triplexer 212 is delivering a downstream signal to all triplexers 214a . . . 214n, or receiving an upstream signal from one or more of the triplexers 214a . . . 214n. The splitter network 222 is connected to each respective one of mixed mode switches 230a . . . 230n, the operation of which will be described shortly.

The Hi output port of the pluggable triplexer 212 may include an up-sampled duplicate of some or all of the signal output by its Mid output port, in a spectrum above that occupied by the downstream signal received by most sub-scribers of the network. This duplicate of the "Mid" signal—representing the downstream signal of the spectrum shared between the upstream and downstream paths, may be iso-lated by high pass filter 226, down-converted by downcon-verter 228m and amplified by amplifier 232 before being fed into splitter/combiner network 234. Each output of splitter/combiner network 234 may be connected to a respective one of the mixed mode switches 230a . . . 230n. Switch control 234 includes logic circuity for independent operation of double throw switch 220 and each of mixed mode switches 230a . . . 230n.

FIGS. 8A to 8D show the operation of the bridger amplifier 210 using switch control 234 to actuate the double throw switch 220 and mixed mode switches 230a . . . 230n. In all positions of the switches 220, 230a . . . 230n, the downstream signal at the output of the "Hi" port of triplexer 212 is continuously delivered to the "Hi" port of each triplexer 214a . . . 214n, and conversely the output of the "Low" port of each triplexer 214a . . . 214n is continuously delivered to the "Low" input port of triplexer 212. As already noted, the double throw switch 220 determines whether the Mid "shared" port of triplexer 212 is delivering a downstream signal to the Mid port of all triplexers 214a . . . 214n, or receiving an upstream signal from the Mid port of one or more of the triplexers 214a . . . 214n. The respective mixed mode switches 230a . . . 230n, for each triplexer 214a . . . 214n are used to deliver the down-converted duplicate of the downstream spectrum to the "Mid" ports of any triplexer 214a . . . 214n not providing an upstream signal in the shared spectrum to the triplexer 212 during a time period in which the double throw switch 220 is in the upstream direction and at least one other triplexer 214a . . . 214n is providing an upstream signal in the shared spectrum to the Mid port input of triplexer 212.

Figure 8A:
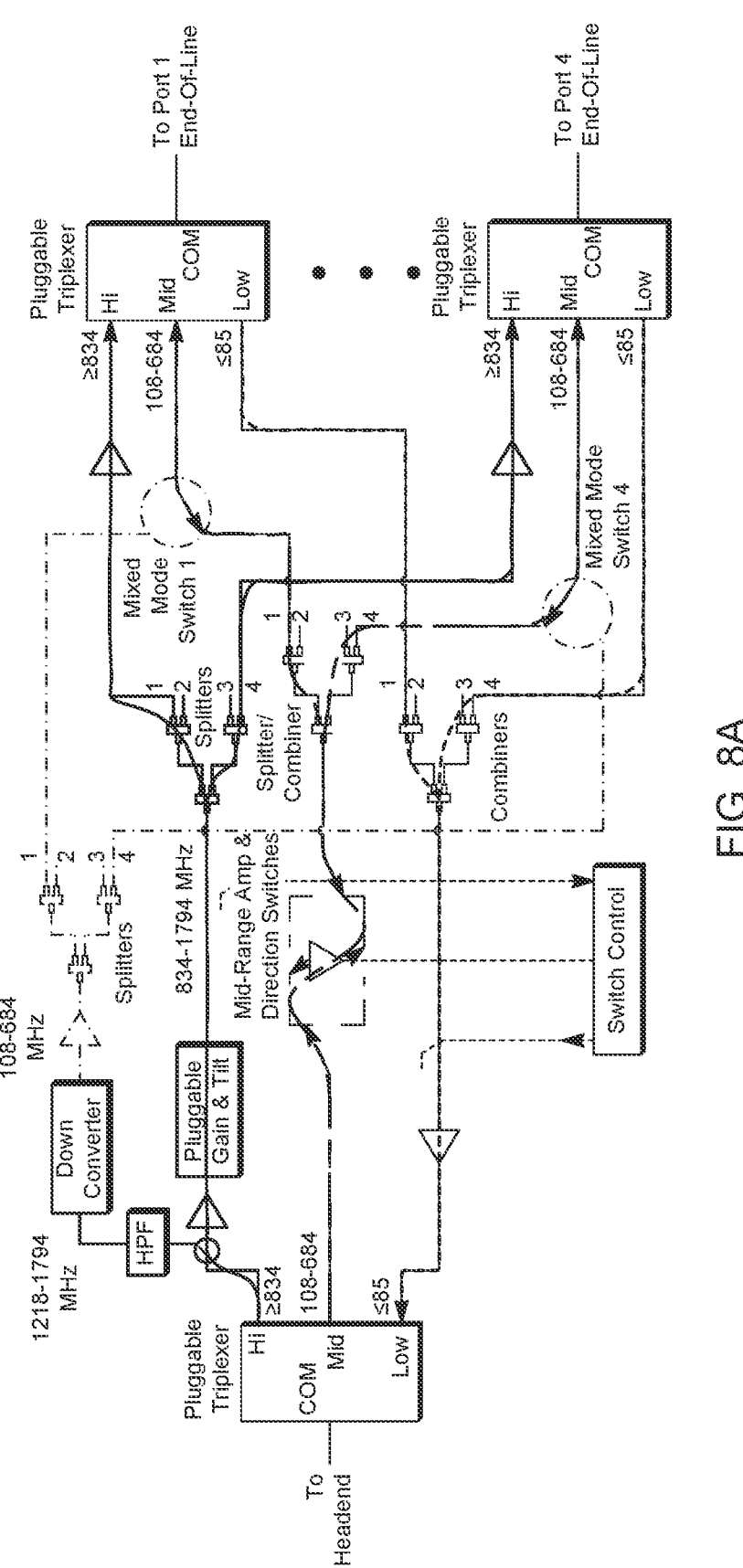
Figure 8B:
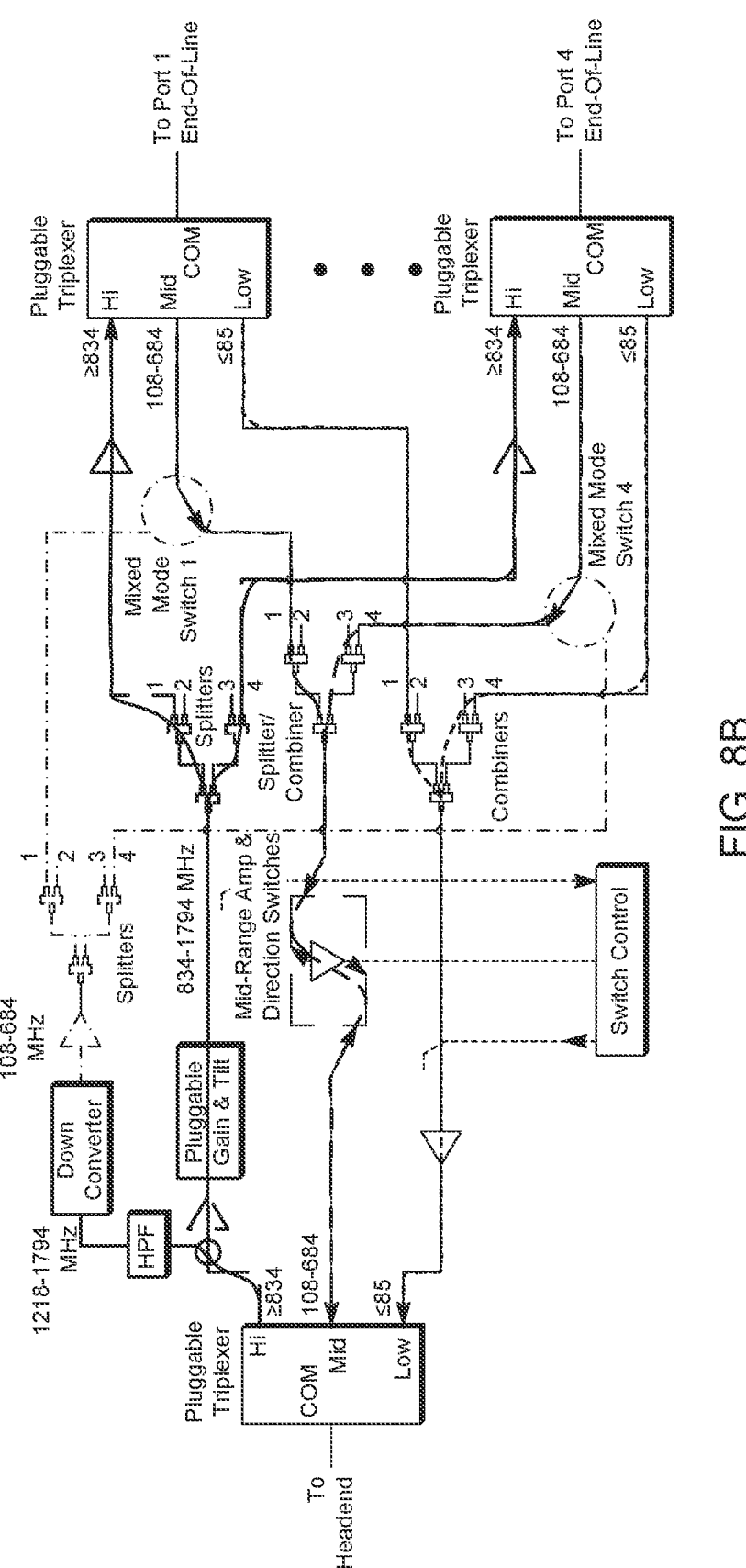

FIG. 8A for example, shows the double throw switch 220 in a position that delivers an amplified downstream signal to the splitter network 222 over the shared spectrum, and each mixed mode switch 230a . . . 230n is in a position that delivers the amplified downstream signal from the double throw switch 220 to the "Mid" port of its respectively associated triplexer 214a . . . 214n. In this configuration, all southbound ports of amplifier 210 are using the shared spectrum to propagate a downstream signal. FIG. 8B, con-versely, shows the double throw switch 220 in a position that amplifies an upstream signal received at the double throw switch 220, and every mixed mode switch 230a . . . 230n is in a position that delivers an upstream signal from one or more of the triplexers 214a . . . 214n to the double throw switch 220 to be amplified and delivered to the "Mid" port of triplexer 212. In this configuration, all southbound ports of amplifier 210 are using the shared spectrum to propagate an upstream signal.

Figure 8C:
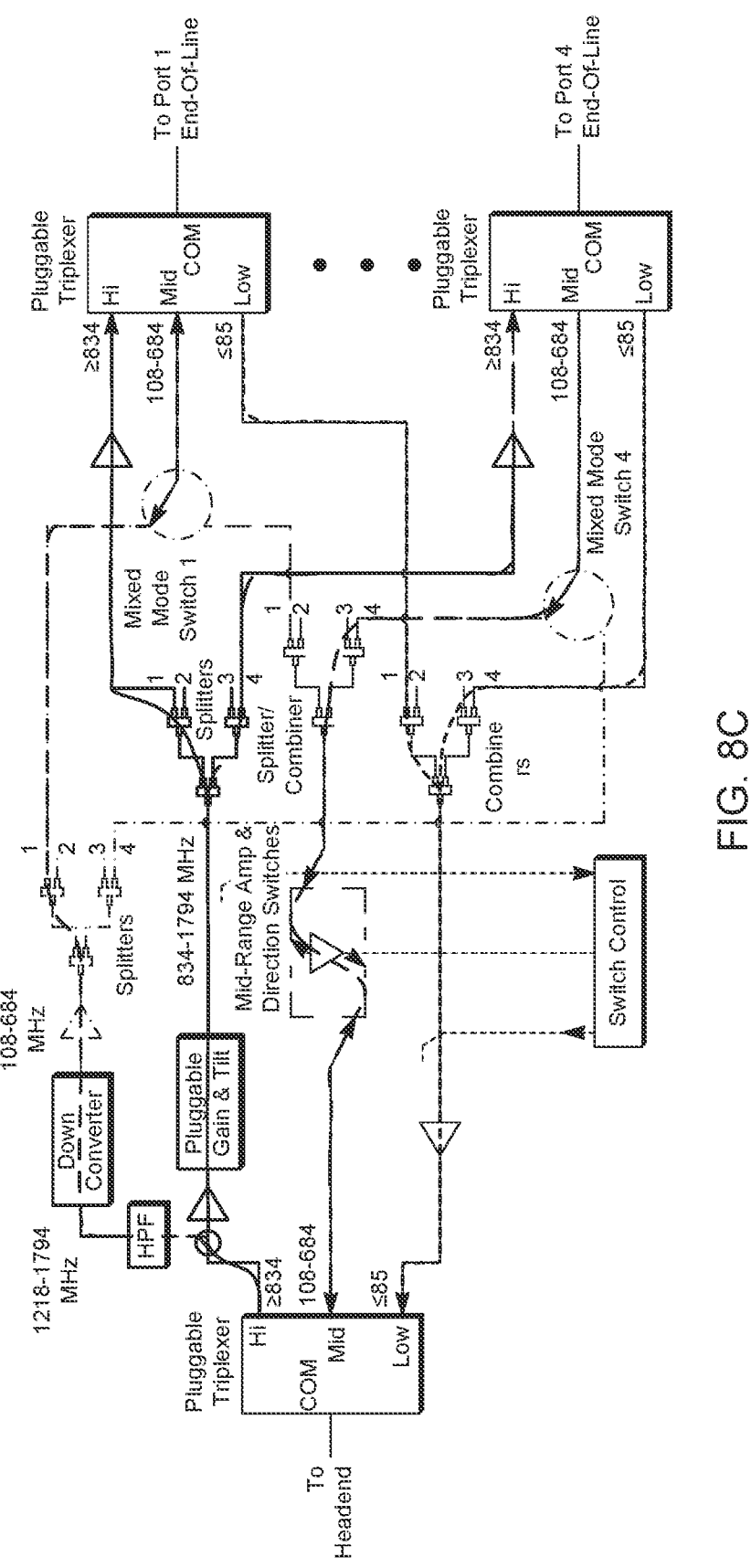
Figure 8D:
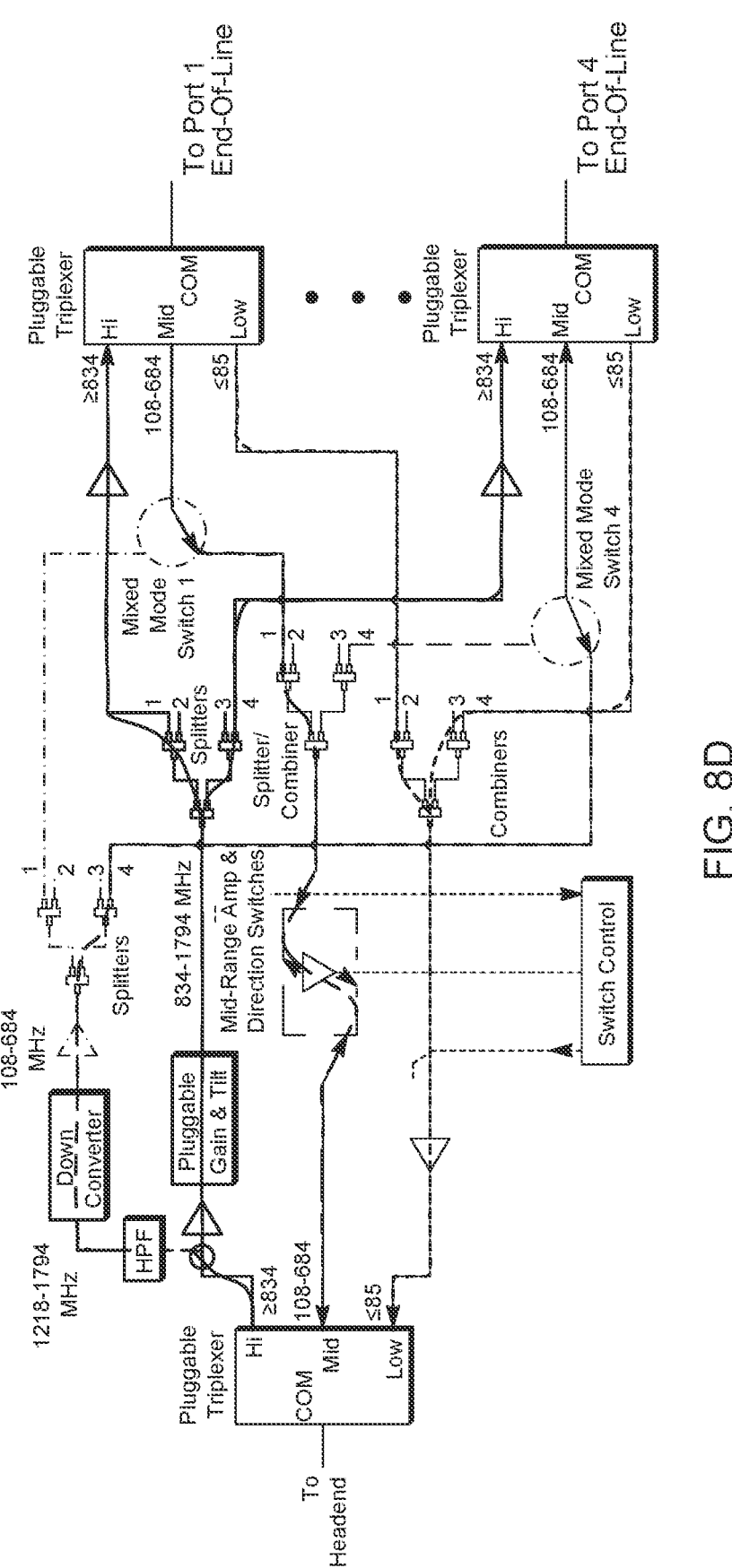

FIG. 8C shows a configuration where pluggable triplexer 214n is delivering an upstream signal to the "Mid" port of triplexer 212 via mixed mode switch 230n combiner net-work 222 and double throw switch 220, while triplexer 214a is receiving a downstream signal at its "Mid" port from triplexer 212. This is because mixed mode switch 230a is in a position that receives the down-converted signal from splitter network 234, which contains a duplicate of the downstream signal that would have been output from the "Mid" port of triplexer 212 had that port not been needed to receive an upstream signal from another southbound port of the amplifier 210. Similarly, FIG. 8D shows a configuration where the pluggable triplexer 214a is delivering an upstream signal to the "Mid" port of triplexer 212 via mixed mode switch 230a, combiner network 218 and double throw switch 220, while triplexer 214n is receiving a downstream signal at its "Mid" port from triplexer 212. This is because mixed mode switch 230n is in a position that receives the down-converted signal from splitter network 234, which contains a duplicate of the downstream signal that would have been output from the "Mid" port of triplexer 212 had that port not been needed to receive an upstream signal from another southbound port of the amplifier 210.

Those of ordinary skill in the art will appreciate that, although the implementation shown in FIGS. 7-8D uses pluggable triplexers, other implementations may also be used, including using pluggable diplexers.

In a traditional FDX system as shown in FIG. 1, inter-ference groups (IG) are organized into Transmission Groups (TG) for scheduling purposes. Each TG is independent of other TGs. If at least one modem is transmitting an upstream signal in a TG, then none of the other modems in that TG can receive a downstream signal at that frequency while modems in the other TGs can receive a downstream signal at that frequency. In a conventional soft-FDD system, an entire RF leg operates as a single TG. In a soft-FDD system operating in "mixed mode", there are now overlapping TGs due to the tree-and-branch topology of the typical node-amplifier network shown in FIGS. 3A and 3B. Referring to FIGS. 9A-9C, for example, the soft duplex configuration of amplifiers and modems that are more northbound of any mixed mode amplifier are dependent on any southbound modem transmitting in the upstream direction. Thus, as shown in FIGS. 9A and 9B, when either of modem 1 or modem 2 is transmitting in the upstream direction, the segment delivering content to modem 3, and modem 3, must be configured to utilize the shared spectrum for the upstream direction because the northbound port of amplifier 3a must be configured to reserve the shared spectrum for upstream content. In FIG. 9A, both modem 1 and modem 3 are considered part of the same TG. But then in FIG. 9B, both modem 2 and modem 3 are considered part of the same TG.

However, modems that are southbound of mixed mode amplifier(s) are not dependent on the upstream transmission of any modem upstream of the mixed mode amplifier(s). Thus, the modems 1 and 2 in each of FIGS. 9A-9C may receive downstream content in the shared spectrum even when modem 3 is transmitting in the upstream direction because each of amplifiers 3a, 4a, and 4b are may down-convert the downstream signal to the shared spectrum since none of the modems served by those amplifiers need to transmit upstream in the shared spectrum. Modems that are at the same level of the tree are usually independent of each other, e.g., RF segments associated with modems. In FIG. 9C, modem 3 is considered to be in a TG by itself. To maximize system capacity, the scheduler needs to be aware of these overlapping TG to know which modems can receive the downstream signal when any given modem is transmitting upstream.

Modems on different RF segments that are at the same level of the tree are independent of each other. That is to say, segments associated with modems 1 and 2 in each of FIGS. 9A-9C may use the shared spectrum for upstream content while others use the shared spectrum for downstream content.

Given these considerations, a novel partial mixed mode architecture is disclosed in which some, but not all, of the amplifiers in a network are configured for mixed mode operation while other amplifiers are not. More specifically in some preferred embodiments amplifiers downstream of a non-mixed mode amplifier are also non-mixed mode amplifier, while amplifiers upstream of a non-mixed mode amplifier may be a mixed mode amplifier. In another (or additional) embodiment, amplifiers on the same level of an amplifier network are either all mixed mode amplifiers, or all non-mixed mode amplifiers. The benefits of the proposed partial mixed mode amplifier will be discussed later in this specification.

Figure 10A:
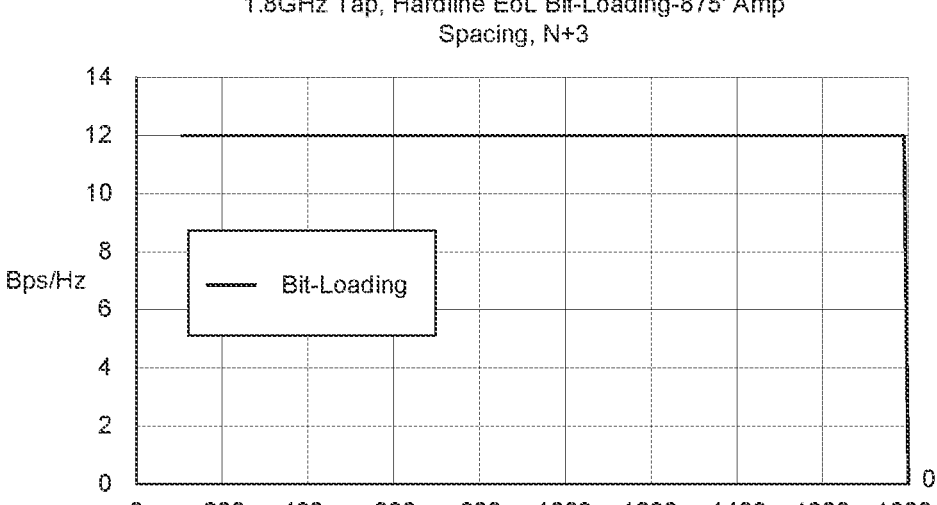
Figure 10B:
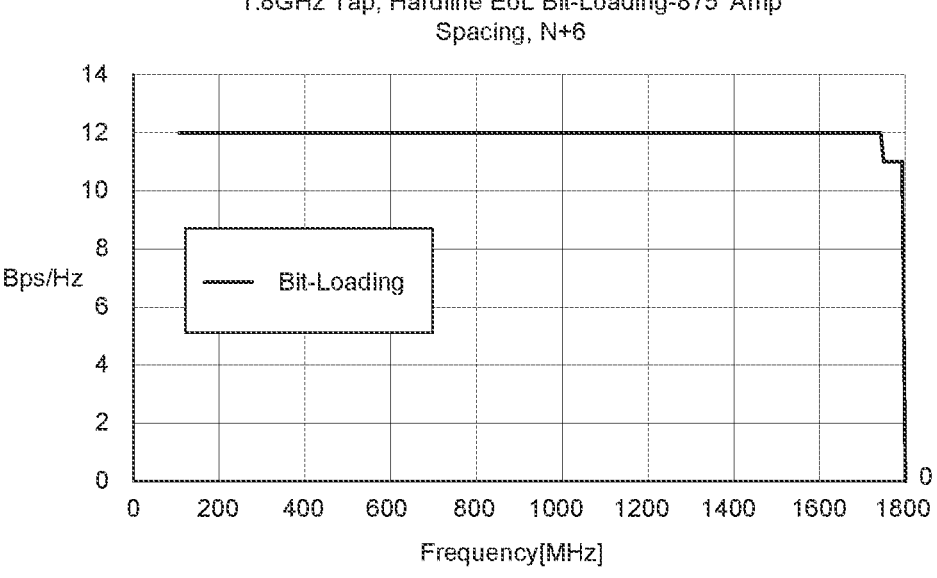
Figure 10C:
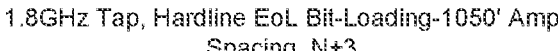
Figure 10C:
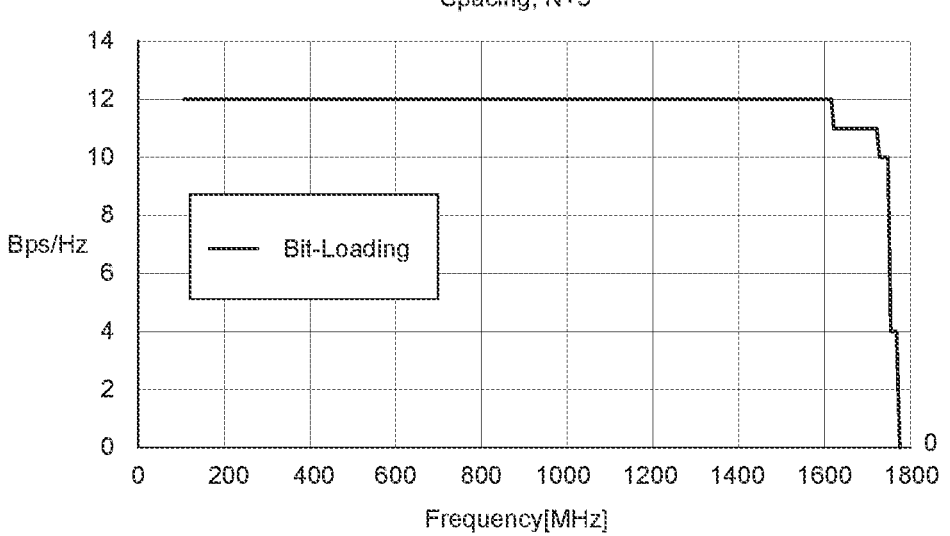
Figure 10D:
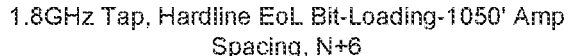
Figure 10D:
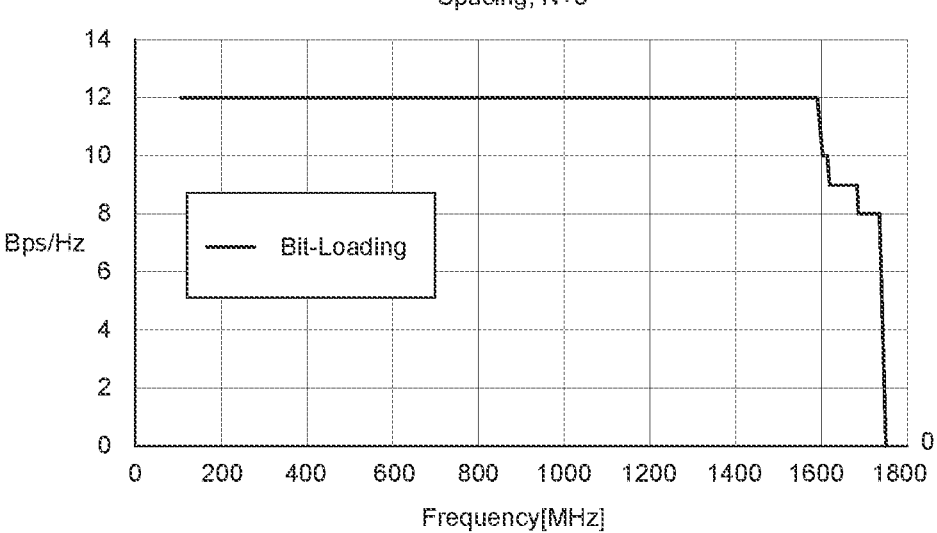

As shown previously in FIG. 5C, maximizing the downstream capacity in the full shared spectrum, 108-684 MHz, requires a DS overlay in the 1218-1794 MHz range to be down-converted (i.e. a maximum of 576 MHz of total bandwidth). FIGS. 10A-10D represent RF simulations run with 1.8 GHz amplifiers and 1.8 GHz taps for 875' and 1050' amp-to-amp spacings, respectively in each of N+3 and N+6 architectures where the numbers 3 and 6 respectively define how many amplifiers are in cascade. As can be seen in FIGS. 10A and 10B, the N+3 and N+6 plants with 875' amp-to-amp spacing achieves basically full capacity all the way to 1794 MHz. FIGS. 10C and 10D with the longer 1050' amp-to-amp spacings achieve almost full capacity, except that there is some slight capacity degradation above 1700 MHz. For 1050' amp-amp spacing N+3 architectures still have high capacity through about 1725 MHz while N+6 architectures still have high capacity through about 1600 MHz. In general, the 1.8 GHz plant will have plenty of capacity across all combinations to fully implement the mixed-mode system as shown in FIGS. 3A and 3B. While Extended Spectrum DOCSIS 4.0 (ESD) modems can natively use the 1218-1794 MHz spectrum, these modems will be in a minority for a very long time. The mixed-mode operation enables this extra capacity above 1218 MHz to be utilized by ordinary DOCSIS 3.1 modems that are limited up to 1218 MHz.

Figure 10E:
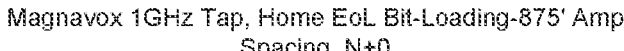
Figure 10E:
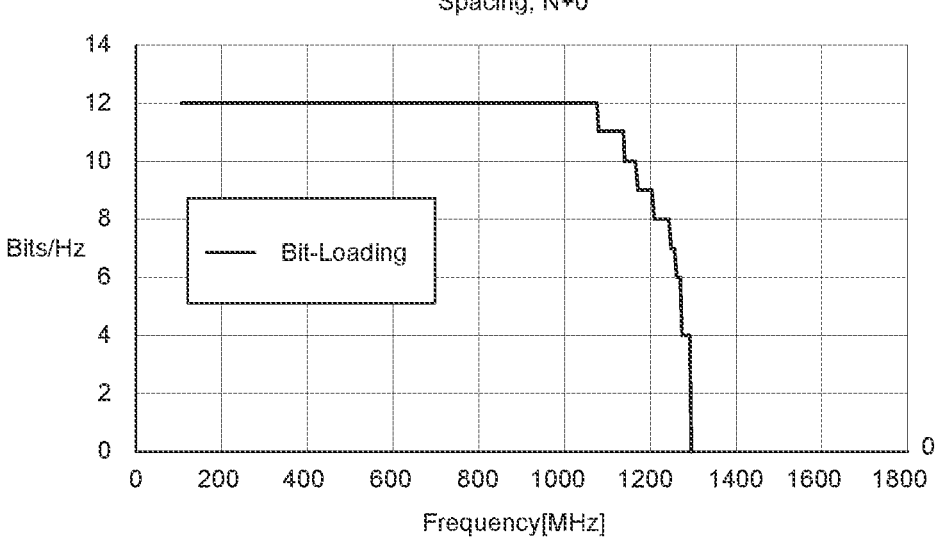
Figure 10F:
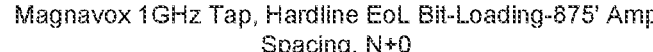
Figure 10F:
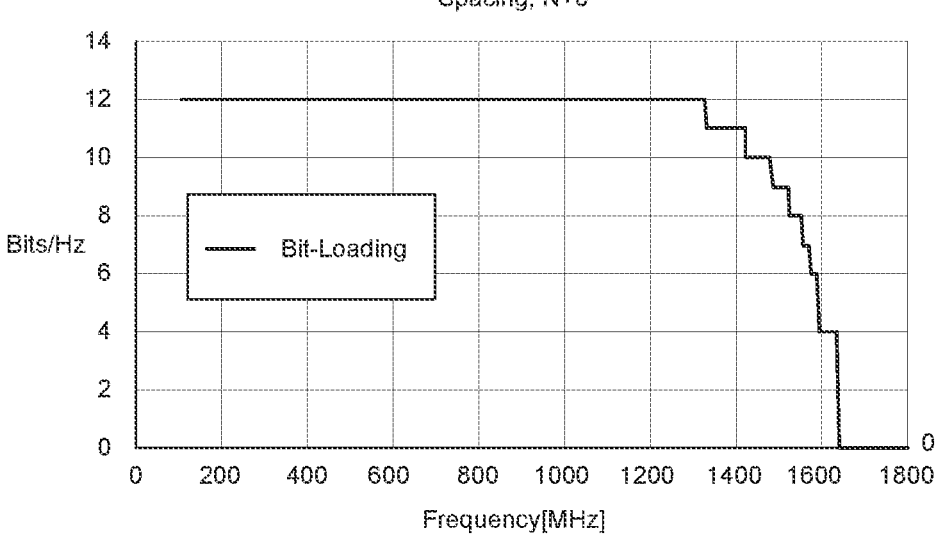
Figure 10G:
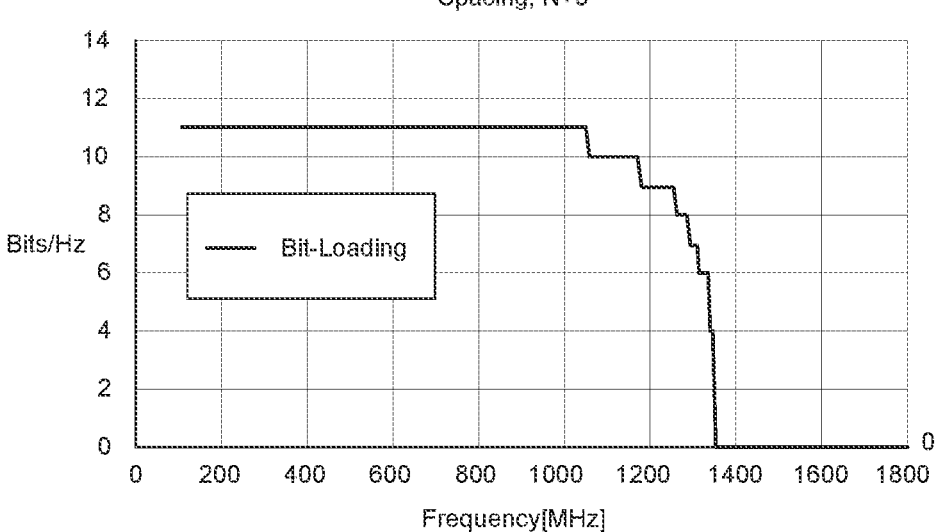
Figure 10H:
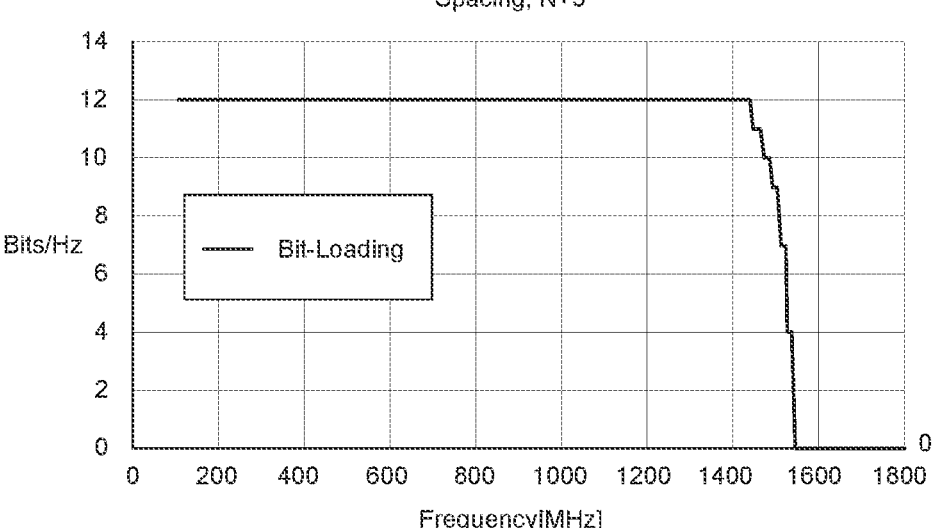

However, most cable plants today have not yet been upgraded to 1.8 GHz. Referring to FIGS. 10E-10H, it was discovered that existing 1 GHz taps, instead of existing coax lines, will likely be the initial limiting factor in upgrading service to soft duplex architectures using mixed mode amplifiers. As noted earlier, the size of the FDX shared spectrum is flexible. These simulated RF results indicate that existing taps (FIGS. 10E-10H) may still have enough excess bandwidth above 1218 MHz to support smaller shared spectrum band sizes of 96/192/288 MHz (or maybe even 384 MHz under very certain conditions). For example, FIG. 10E shows that a N+0 architecture with common 1 GHz Magnavox taps may only support bandwidth up to about 1250 MHz to the End-of-line (EoL) home with a 100' drop cable, which is still quite adequate to provide services up to 1218 MHz. However, FIG. 10F shows that the same 1 GHz Magnavox tap can provide nearly 1500 MHz of bandwidth over the hardline coax to the first amplifier in the cascade after the fiber node. This example shows that while home devices may be limited to 1218 MHz due to losses in the drop cable, the first mixed-mode amplifier might receive 288 MHz of downstream overlay in the 1218-1506 MHz spectrum. FIGS. 10G and 10H show a second example RF simulation using a N+3 architecture with common 1 GHz RMT-1 taps that provides ~1350 MHz of bandwidth to the EoL home (last tap after the third amplifier) but can deliver just over 1500 MHz to the next (fourth) mixed-mode amplifier in the cascade. Thus, the mixed-mode system can utilize these upper bandwidths that are not available to the home. However, longer term once larger shared spectrum bands such as 108-684 MHz are required, then some of these existing taps may need to be replaced, which is much simpler then splitting a node and pulling fiber deeper into the network.

Given these considerations along with the fact that upgrading all of the taps to 1.8 GHz is a costly and time-consuming task, FIGS. 11A and 11B show various embodiments of a partial "mixed mode" architecture in which some amplifiers in a network are upgraded to "mixed mode" while others are not. Referring specifically to FIG. 11A, an architecture 300 may comprise a fiber node 302 that provides downstream and upstream service to a network 304 of amplifiers. At least a first amplifier 306 is configured as a "mixed mode" amplifier as described in the foregoing specification and shown in FIG. 7 while at least a different amplifier 308 is not configured as a "mixed mode" amplifier but as a conventional soft-FDD amplifier such as the one shown in FIG. 4C. It is expected that the conventional soft-FDD amplifier 308 will be simpler and more cost effective then the "mixed mode" amplifier 306. Therefore, it may be desirable to limit the total number of "mixed mode" amplifiers 308 in the network 304. The architecture 300 shown in FIG. 11A, for example, may be a first phase of a gradual upgrade to full mixed mode operation, where in this first phase only "Amp 1" that is directly connected to the node is upgraded to mixed mode operation. This effectively splits the ports of Amp 1 into two transmission groups (TG), where all downstream amplifiers connected to the top port of Amp 1 are in a single TG (where all amplifiers are configured to transmit upstream/downstream in the shared spectrum as a group) and all downstream amplifiers connected to the bottom port are in a second, different such TG. Where Amp 1 has been upgraded to be a "mixed mode" amplifier, taps between the node and Amp 1 need to be upgraded only if/when the shared spectrum band exceeds what the taps can support as shown in FIG. 10E-10H. This works well provided the traffic load is reasonably spread across the "Amp 1" ports.

If traffic usage continues to rise or the traffic is not evenly balanced between the "Amp 1" ports, then there may be a need to split into additional smaller TGs. Referring specifically to FIG. 11B, a partial mixed mode architecture may similarly include a configuration where Amp 1, as well as one or both of Amp 2a and Amp 2b may be upgraded to mixed mode operation, in e.g., a second upgrade phase where one or more existing TGs of amplifiers are further split. Thus, for example, where Amp 2a is upgraded to mixed mode operation amplifiers 3a, 4a, 4b are split into a different TG than amplifiers 3b, 4c, and 4d. Similarly, when amplifier 2b is upgraded to mixed mode operation, amplifiers 3c, 4e, and 4f are split into a different TG than amplifiers 3d, 4g, and 4h. Again, once either or both of amplifiers 2a, 2b are upgraded to mixed mode operation, the taps between these amplifiers and Amp 1 need only be upgraded if the shared spectrum band exceeds what the taps can support as shown in FIG. 10E-10H. Amplifiers may be upgraded, as previously described, by either replacing the amplifier with a mixed-mode amplifier or by modifying the existing amplifier in the field to provide it with mixed-mode functionality through, e.g. a plug-in module.

Those of ordinary skill in the art will appreciate that, by careful selection of which amplifiers in a network to upgrade to mixed mode operation, the most efficient upgrade path over time may be achieved. Thus, in some embodiments, upgrading a network to mixed mode operation may include a phased upgrade where amplifiers are upgraded based on their hierarchical level in the network, which should ordinarily correspond to the distance between the amplifier and the node. In such embodiments, a phased upgrade may involve upgrading all amplifiers at the same level prior to upgrading an amplifier at the next level. In other embodiments, a phased upgrade may involve a more flexible approach where a first amplifier is upgraded only while all other amplifiers in the upstream path from the first amplifier to the node are also upgraded. In this manner, no amplifiers are upgraded to mixed mode operation in a sequence such that the use of that amplifier in mixed mode is not fully enabled at that time.

FIG. 12 shows the cost-benefit of the partial mixed mode architecture just described in that allows Multiple System Operators (MSOs) to build out their next generation hybrid-fiber coax plant in a simplified, cost-effective manner. Assuming the N+4 tree-and-branch topology of FIGS. 11A and 11B, for example, where there are fifteen total amplifiers, upgrading to a single first-level partial mixed mode architecture as shown in FIG. 11A has minimal investment for providing transmission group segmentation into two TGs, where only one out of the fifteen amplifiers need to be upgraded, and one out of 31 segments might need new taps. yet this single upgrade allows 48% of the RF segments to still receive downstream transmissions when one modem is transmitting in the upstream direction.

Similarly, assuming that in a next phase only amplifiers 2a and 2b are upgraded to mixed mode as shown in FIG. 11B, only three out of 15 amplifiers will have required an upgrade, and three out of 31 RF segments might have taps needing upgrades, yet 71% of the RF segments will still have access to downstream transmissions in the FDX band when any one modem is transmitting in the upstream direction. Compared to upgrading the entire plant (15 amplifiers plus taps on 31 RF segments), the second phase is still relatively cost effective (3 amplifiers and perhaps taps on 3 RF segments) but the shared DS spectrum is now available to almost 50% more of the network then in the first phase. However, as FIG. 12 shows, adding mixed mode amplifiers at each additional level requires even larger investments, yet the additional gains keep shrinking. Such diminishing returns continue with respect to third and fourth such phases. Therefore, one of ordinary skill in the art can easily appreciate that careful selection of which amplifiers to upgrade to mixed mode operation can achieve dramatic cost savings for any given amount of RF legs (i.e., customers) upgraded to utilize the mixed mode, shared spectrum band.

As already noted, segmenting spectrum between upstream and downstream transmission makes it difficult to deliver multi-gigabit services, as well as to fulfill recent trends in the cable industry such as deployment of DOCSIS 3.1 Orthogonal Frequency Division Multiplexing (OFDM), deep fiber migration, and distributed access architectures such as R-PHY, R-MACPHY etc. Moreover, even a DOCSIS 3.1- enabled OFDM network is still limited by what throughput is practically achievable by modulation (~10 bits per second per hertz). DOCSIS 4.0 attempts to address the issue of limited capacity, particularly upstream capacity by expanding the occupied spectrum from 1.218 MHz to 1.794 MHz in the "extended spectrum DOCSIS®" (ESD) frequency domain division (FDD) with a corresponding higher US split (e.g. 300/396/492 MHz) and/or by allowing for "duplex use" of the spectrum, otherwise known as "Full Duplex DOCSIS®" (FDX), which offers total upstream and downstream capacity in the 15-18 Gbps range.

Both of these architectures have drawbacks. For ESD, all of the active elements—i.e., head ends, nodes, RF amplifiers, hardline taps etc., need to be upgraded to 1,794 MHz versions which is expensive, and the expansion of upstream spectrum is provided at the expense of downstream capacity. For FDX implementations, existing taps may be used if they are already capable of 1,218 MHz throughput, but as noted earlier, RF amplifiers in the network limit the segmentation of customers into service groups and thereby limit the bandwidth that is able to be provided to each subscriber. Although FDX network topology is envisioned to migrate to N+0, which would eliminate this issue, migration to N+0 architectures would in many cases be more costly than ESD upgrades.

Disclosed in this specification are soft duplex architectures, and methods for operating the same, that provide an alternative to each of the ESD and FDX architectures, and that provide additional total capacity at reasonable cost. Specifically, the present specification discloses amplifiers and nodes that implement soft duplex architectures by which: (1) a first portion of spectrum is reserved for upstream transmissions; (2) a second portion of spectrum is reserved for downstream transmissions; and (3) a third portion of spectrum—which may be positioned between the first portion and the second portion, is shared in a time-division duplex (TDD) manner between upstream and downstream directions.

FIG. 13, for example, shows an exemplary amplifier 400 with opposed triplexers 402a and 402b that divide the available spectrum between a first portion (5-85 MHz) reserved exclusively for upstream transmissions, a second portion (800-1280) reserved exclusively for downstream transmissions, and a third portion (108-684) that is shared between upstream and downstream transmissions in a TDD manner. Each of the upstream and downstream signals is amplified by respective amplifiers 404b and 404a, respectively, while an amplifier block 410 includes two amplifiers 412, 414 for amplifying downstream and upstream signals, respectively. A modem 408, via directional coupler 406, receives a control signal at the northbound port of the amplifier 400 so as to control the amplifier block 410 so as to either amplify the downstream signal or the upstream signal, depending on which is using the shared spectrum.

The triplexer implementation as shown in FIG. 13 provides an "always on" path in both DS and US, which is critical for supporting legacy STB and DOCSIS signals. By allowing a portion of the spectrum to be shared, this triplexer implementation adds capacity to the system without expensive upgrades to head ends, taps, etc. and does so without the expense of migrating to a node-plus-zero (N+0) architecture. FIG. 14 shows an alternate, improved triplexer implementation relative to that shown in FIG. 13. Specifically, an amplifier 500 may includes opposed triplexers 502a and 502b that divide the available spectrum between a first portion reserved exclusively for upstream transmissions, a second portion reserved exclusively for downstream transmissions, and a third portion that is shared between upstream and downstream transmissions in a TDD manner. The triplexers 502a and 502b are shown in FIG. 14 as implementing a 5-204 upstream, 258-396 shared, and 492 and higher upstream splits, respectively, but those of ordinary skill in the art will easily appreciate that other splits are easily implemented. For example, the 5-85, 108-684, and 800 and up splits shown in FIG. 13 may be preferable. Alternatively, in one preferred embodiment, 5-85, 108-396 and 492-1794 splits are effectuated by the triplexers 502a and 502b.

Unlike the amplifier 400 of FIG. 13, the amplifier 500 also includes a pluggable gain and tilt module 512 as well as an amplifier 514 in the downstream path as described above with respect to FIGS. 4A-8D. Also, unlike the amplifier block 410 of FIG. 13 which uses two amplifiers 412 and 414, the amplifier 500 preferably includes a mid-range amplifier block 504 having a single, switched amplifier 510 that operates as described above with respect to FIGS. 4A-8D above. Further, unlike the amplifier 400 of FIG. 13, the amplifier block 504 also optionally includes separate gain and tilt modules 506 and 508 for the upstream and downstream signals, respectively. This is because the amplifier 510 in the downstream direction must compensates for the amplifier spacing "northbound" of the amplifier 500, but the amplifier 510 in the upstream direction must compensate for the amplifier spacing "southbound" of the amplifier 500, and these two spacings could be—and often are—different and therefore have different attenuations/tilts. Moreover, if the shared spectrum extends upwards to 682 MHz, then the required gain of the mid-band may be as high as about 30 dB which may be too high of gain to achieve with just one stage. To this end, in either the upstream or downstream direction the combination of the amplifier 510 with the respectively used one of gain and tilt modules 506 or 506 may provide two-stage amplification. In the case of two-stage amplification, the 506 and 508 "gain and tilt" modules could be implemented interstage, or just a portion of it implemented interstage with the rest implemented as shown in FIG. 14.

FIG. 15 shows the switch positions when the mid band is used in the downstream direction in either of the amplifiers of FIGS. 13 and 14, while FIG. 16 shows dedicated upstream and downstream bands of 5-204 MHz and 492-1794 MHz, respectively, as well as the shared mid-band of 258-396 MHz, with a first guardband (204-258 MHz) separating the dedicated upstream band from the shared band and a second guardband (396-492 MHz) separating the shared band from the downstream band. Although, as compared to an FDX architecture, the triplexer implementations of FIGS. 13 and 14 include guard bands that reduce available bandwidth in shared spectrum, any potential reduction or elimination of these guard bands would provide additional bonus capacity to the system.

Regardless of which of the amplifiers shown in FIGS. 13 and 14 are used, switching the mid-band between the upstream and downstream traffic is preferably fast and demand driven, e.g., as fast as 10 microseconds or less, and occurs synchronously in all amplifiers in the path between a customer and an edge device, such as a head end or a distributed access architecture (DAA) node, synchronously driven from a MAC scheduler in either a Cable Modem Termination Service (CMTS) or a Remote MACPHY device, thus assuring that all the mid bands on all the amplifiers in the path are already switched in the desired direction, before the requested bandwidth throughput were to utilize the selected direction of the mid channel. In some embodiments, the demand-driven mid-band direction switching could occur on short time scales, e.g., as fast as 10 microseconds or less. In other embodiments, the mid-band switching could be relatively slow and software selectable. In one such embodiment, it could be timed by the operator. For example, the traffic in the mid-band may be switched into the upstream position during the day, when at-home activities drive the extra demand, and then switched over into the downstream position in the high-demand hours in the evening; only to reverted back to the upstream in the next morning. The "slow" switching might be on the order of hundreds of milliseconds and controlled by the CMTS/MAC scheduler. This switching rate would still be sufficient to handle network bursts that span a few seconds. Those of ordinary skill in the art will understand that the scheduler can effectively time-division multiplex between upstream and downstream capacity needs on a granularity that is more or less coarse than this example.

This "slow" switching is analogous to highway traffic management schemes that use center lanes that switch directions mid-day, as shown in FIG. 17. The "divider barrier", shown in this figure loosely correspond to the RF triplexer filters, with their "guard bands" that separate and isolate portions of the RF spectrum to make sure the "traffic directions" don't interfere with each other. As noted above, the speed at which the shared band switches between upstream and downstream directions is a critical design consideration, and will govern the components used in the amplifiers disclosed by the present application. For example, typical network delays due to signals propagating through fiber/coax are approximately 30 ns/m (60 ns round trip) and therefore any switch from upstream to downstream and vice versa will of necessity involve at least this network delay. If fast switching is desired (e.g., switching on the order of tens of microseconds), appropriate components must be selected. Some RF switches for example, have switching rise/fall times under 4 ns while others are as slow as ~35 μs. Furthermore, the mid-band of a cascade of these amps must be synchronously operated.

Although FIGS. 13 and 14 illustrate amplifier components of the demand-driven, soft duplex architectures disclosed in this specification, network optical fiber nodes also must be configured to enable switching of a shared spectrum between upstream and downstream directions. To this end, the node implementation of FIG. 4A may be used. Alternatively, the node implementation 600 shown in FIG. 18 may be used, which implements a dedicated upstream band of 5-204 MHz and a dedicated downstream band of greater than 492 MHz, and a shared mid-band of 258-396 MHz. The node implementation 600 may service up to four service groups via four RF legs 620, and may comprise a "CMTS module" that is configurable for delivering downstream service to two service groups and upstream service to either two service groups or four service groups. The node implementation 600 is shown in FIG. 18 as Remote MAC&PHY Device (RMD), however other nodes may be Remote PHY Devices (RPD).

In operation, the node 600 as shown in FIG. 18 will constantly transmit downstream data above 492 MHz via splitters 619, 618a, an amplifier 614a and the triplexer 612 high port. The node 600 is constantly receiving upstream data below 204 MHz via the triplexer 612 low port, an amplifier 614b and combiner 618b. The mid-band spectrum can be dynamically be changed to the upstream or downstream direction by appropriately configuring the switch/amplifier 616. Each port of node 600 is capable of operating between a first mode where downstream signals are provided from each downstream port DS 1, DS 2 to the mid-port of a respective pair of the four triplexers 612 due to the position of the double throw switch/amplifier 616. In this mode, the triplexer 612 mid-port is providing downstream signals in 258-396 MHz and the upstream signals, 5-204 MHz, from the only the low port of each of the triplexer 612 is routed to US 1 to US 4 ports of the node 600. In a second mode of operation, however, the double throw switches/amplifiers 616 are actuated to instead connect the mid-port of a triplexer 612 to its respective upstream port US 1 to US 4 via combiner 618*b* and disconnect the downstream signals from the mid port of each triplexer 612. In this second mode of operation, both the low port and mid port of the triplexer 612 are connected to a respective upstream port US 1 to US 4 of the node 600, while only the high port of the triplexer 612 receives a downstream signal. The node 600 also preferably includes a switch control module that performs the same operations as the module 516 in the amplifier of FIG. 14.

Those of ordinary skill in the art will appreciate that other configurations of splitters/amplifiers may achieve the same functionality as shown in FIG. 18. For example, instead of having a downstream port of the RMD 610 connected to a first 1×2 splitter 619 that in turn feeds two 1×2 splitters 618, these three 1×2 splitters may simply be replaced by a single 1×4 splitter. Similarly, other pluggable triplexers implementing different splits, and/or combinations of diplexers may be utilized instead.

The same low/mid/high triplexers are used as in the RF amplifiers are included in the RF portion of node 600. As in the RF amplifiers, the "switch control" is required for the mid-band direction change in the node 600 as well. In the case of the RMD implementation, the switching instructions originate from within the RMD module. It could be software selectable by an operator, as described above for the "slow switching", it could be a pre-selected timed protocol (e.g., upstream during the day work and school hours, downstream the rest of the time).

In a case of "Fast Switching" the protocol for evaluating when to switch and how to carry on the switching of the mid band direction in some embodiments may in some embodiments follow the following steps:

1. Establish a default position. In a preferred embodiment, the downstream direction is the default direction;
2. MAC Monitors and evaluates downstream and upstream traffic demand with the MAC device in the network. If, due to an increased peak demand in the upstream direction the "trigger point" to switch directions is reached, then MAC scheduler issues a "Reverse mid band lanes to upstream" command. Preferably, in some embodiments there should also be a concurrent check to see if the downstream demand is not in need of the mid band channel at that time;
3. In some preferred embodiments, propagate this command to a switch control module in the node, such as a switch control module similar to module 516 in the amplifier of FIG. 14. In one implementation, this module a) switches the node's mid band direction the upstream direction and b) communicates downstream to at least all of the amplifiers between the node and the requesting cable modem demanding the elevated upstream traffic. In some embodiments, all of the amplifiers following the node synchronously change the mid-band direction to the upstream—i.e., not merely the amplifiers between the node and the requesting cable modem;
4. The switch control modules in the node and downstream amplifiers perform "reliable communication channel established" checks—e.g., exchange ACK/

NACKs, exchange "handshakes," issue "switch direction" commands, and receive ACKs that the mid band direction change has been accomplished over the whole channel;
5. The MAC and Upper Layer Protocol Interface (MULPI) deliver the increased demand in the upstream;
6. Once the requests for downstream bandwidth exceed a predefined threshold, or the upstream bandwidth needs diminish below a predetermined threshold, the MAC scheduler issues a command to revert the mid-band direction back to the default direction (downstream).
7. As in steps 3, 4 and 5, the command is issued to the node and is propagated to all of the amplifiers that had previously switched from downstream to upstream.
8. The mid band direction returns to the default position and the MAC continues monitoring downstream and upstream traffic as described.

In some embodiments, the switch control decisions and signalling may originate in the head end in case of centralized and/or RPD implementation. In that latter case, the RPD would simply pass those instructions arriving from the head end located in the MAC core to the node and amplifier switch modules. Since the head end could be tens of miles away from the node, that distance converts into hundreds of microseconds of signal propagation delay. Thus, in preferred embodiments, switching control occurs in the node due to its closer proximity to the amplifiers and modems at customer-premises.

There may be many different mechanisms that could be used to effectively switch the mid-band region between the upstream and downstream directions. At its simplest, the node and RF amplifiers need only determine two states: e.g., downstream direction ON/OFF for the mid-band selection circuitry. Some possible methods to pass this information from the CMTS to the RF devices on the HFC might include:

1. pilot tones (with or without BPSK signaling). Such pilot tones could be a broadcast only mechanism, where the amplifier only needs to detect and react in a timely manner, and could also potentially reuse pilots from the DOCSIS 3.1/4.0 OFDM channels;
2. a simple mechanism that detect downstream power/ activity in the mid-band spectrum.

These may be similar to Radio-Frequency-over Glass (RFOG) mechanisms. Whenever the CMTS propagates a downstream signal in the mid-band frequencies, that signal contains a pre-amble prior to the information-carrying portion of the signal; any mid-band amplifier that detects power in the downstream direction switches to downstream as soon as it sees power. Otherwise, they are set in the upstream direction. Alternately, a defined pilot in the mid-band could be used, or such a pilot can reside in the upper (fixed downstream) band as well, if desired. The benefit of these schemes is hardware simplicity and that the switch timing is synced with signal arrival, compensated for network delays, and no protocol is required at the amplifiers. Conversely, the drawbacks are switching delays and some RF design aspects, but these are not as severe as occurs in RFoG because the downstream spectrum is well-defined compared to the upstream;

3. simple FSK signaling with low Bandwidth and using only a few Kbps. This is easy to implement in a cost-effective manner given that FSK transceivers available for less than $10 operate on less than 1 watt;
4. re-use Set Top Box (STB) Out-of-Band (OOB) signaling protocols. For example, SCTE 55-1 logic already implemented in existing FPGAs of a CMTS could be replicated in a smaller FPGA in an amplifier. Also, in some embodiments, the amplifier could be modified to be an OOB repeater, and thus replace the OOB bypass;
5. re-purpose PHY Layer Control (PLC) from DOCSIS 3.1. This is a small 8-subcarrier channel currently used to convey Orthogonal Frequency Division Multiplexed (OFDM) channel configuration in order to boot the OFDM channel, and could be implement in small FPGA.
6. Implement whatever protocol is adopted by the FDX Amplifier group.

Other possibilities exist. In general, a designer just needs something with an FPGA or simple microcontroller, and does not need a full-blown processor, plus memory, plus software with downloads, etc.

Those of ordinary skill in the art will also appreciate that the dynamic soft-FDD approaches disclosed in the present application are just as valuable in a 1.8 GHz system. If the MSO wants to offer 4G×4G symmetric services, they will need to implement a 684/834 MHz diplexer, which leaves very little spectrum above 834 MHz for legacy Customer Premises Equipment (CPE) devices, and thus means that the MSO would need a majority of CPEs to be converted to DOCSIS 4.0 CPEs. A dynamic soft-FDD 1.8 GHz would allow 258-1218 MHz to be used by installed DOCSIS 3.1 modems (which may be the majority of CPE devices by later this decade).

Some preferred embodiments may also mitigate the consequences of switch failures in the disclosed systems. As one example, the use of double throw switches as described above mitigates the consequences should only one of the switches becomes stuck; the other switch operation will render the stage "passive" and prevent oscillation. However, if a short occurs inside a switch, due to lightning strike damage for example, the amplifier will oscillate, even with a double throw switch. This condition may be protected against by doubling the switch; at least a double failure would be needed for the switch to fail and oscillate. Also, some implementations could use diode limiters at the Monolithic Microwave Integrated Circuit (MMIC) input to prevent input overdrive (implicitly limiting output levels) to prevent switch failure. This should not damage the MMIC or other MMICs in the amplifier chain, and it affects only the mid-band i.e., the dedicated upstream and downstream bands remain fully operational.

Regarding performance of the disclosed systems and methods, cascading filters increases loss; at 1.8 GHz loss should be avoided to the extent possible to help the power amplifier (PA). Additionally, there are the bandwidth advantages when using the gain blocks properly. Increasing the lower cutoff frequency of the 1.8 GHz (PA) permits a more efficient PA design. Depending on the tilt of downstream spectrum loading, the power loading below 400 MHz may be less than 10% of that in the 400-1800 MHz range, so there is no need to use a "power-hungry" PA. Furthermore, distortion-wise, the PA should perform better if the spectrum below 400 MHz can be removed from the PA because the low frequency channels that have poor signal to noise ratio are removed. Furthermore, couplers and transformers inside the gain blocks will benefit as well, because of "better magnetic behavior" of the materials those couplers are build out of FIG. 19 shows model S-parameter plots of the disclosed triplexer implementation for 5-85/108-396/492-1218 splits, and demonstrate that it performs well. The insertion loss can be expected to be less than approximately 1 dB based on these simulations; though the results actually show less than 0.5 dB loss, the printed circuit board (PCB) layout parasitics are not taken into account, which will degrade the insertion loss by approximately another ~0.5 dB. The simulation also shows that isolation is very good, being similar to traditional individual diplexer's isolation.

For example, the isolation requirement can be relaxed in a way that ripple, caused by non-perfect isolation, can be allowed—but not oscillation. When mid band amps are in downstream mode, then the 396/492 crossover can be deliberately "sloppy" (less isolation) to bring the bands close to each other. Proper design of delays in the amplifier can keep the ripple due to downstream amplifier interference limited. When the mid band is in the upstream mode, then this crossover matters more, but placing a filter in the mid-band amplifier path for the upstream can provide the extra suppression needed to avoid oscillation problems. Implementing such a filter crossover does not sacrifice much in downstream bandwidth. With the mid-band amplifier in upstream mode, this "sloppy" crossover is desired in the 85/108 guardband, so the diplexer may also be "sloppy." However, preferably an extra filter is placed in the downstream path of the mid band to prevent ripple/oscillation when mid-band amplifier is in the downstream mode.

FIG. 20 shows an alternate embodiment to the design of FIGS. 13 and 14. In this alternate embodiment, an amplifier 650 (or a node) may comprise triplexers 652a and 652b that split the upstream and downstream signals into and out of an amplifier/node into a high band using a high pass filter (e.g., >492 MHz) dedicated to a downstream signal, a low band using a low pass filter (e.g. <85 MHz) dedicated to an upstream signal, and a mid-band using a band pass filter (e.g. 108-396 MHz) that may be switched between upstream and downstream mode. However, unlike the design of FIGS. 13 and 14, the design of FIG. 20 does not need for a dedicated amplifier for the switchable bandwidth (108-396 MHz), and the associated circuits (Bode EQ and Cable EQ). Instead, this implementation only uses two amplifiers 654a and 654b to amplify downstream and upstream signals, respectively. On either side of amplifier 654a, which amplifies in the downstream direction, are diplexers 656a which pass signals above 492 MHz in this example, and also pass signals below 396 MHz. Similarly, on either side of amplifier 654b, which amplifies in the upstream direction, are diplexers 656b which pass signals above 108 MHz in this example, and also pass signals below 85 MHz. Switches 658 are used to connect the respective band pass filters of triplexers 652a, 652b to a respective one of the diplexers 656a or 656b, depending on whether the mid-band is used to transmit downstream or upstream signals. As can be seen in this configuration, when the switches 658 connect the band pass filters of triplexers 652a, 652b to the diplexers 656a, the downstream signal comprises the dedicated band greater than 492 MHz as well as the mid-band of 108-396 MHz, and this downstream signal is amplified by amplifier 654a. Conversely, when the switches 658 connect the band pass filters of triplexers 652a, 652b to the diplexers 656b, the upstream signal comprises the dedicated band less than 85 MHz as well as the mid-band of 108-396 MHz, and this downstream signal is amplified by amplifier 654b Since there are no cross-over isolation requirements the diplexers 656a, 656b, the diplexer design will be much simple than a regular diplexer, the size of these diplexers will be half of a regular diplexer, and the insertion loss of these diplexers at 1.8 GHz will be less than 0.3 dB.

FIG. 21 shows a second alternate embodiment to the design of FIGS. 13 and 14. Specifically, an amplifier 660 (or a node) may comprise triplexers 662a and 662b that split the upstream and downstream signals into and out of an amplifier/node into a high band using a high pass filter dedicated to a downstream signal, a low band using a low pass filter dedicated to an upstream signal, and a mid-band using a band pass filter that may be switched between upstream and downstream mode. Like the implementation shown in FIGS. 13 and 14, the amplifier 660 has respective amplifiers 664a, 664b, and 664c for the downstream, upstream, and shared mid-band signals, respectively. Unlike the implementation shown in FIGS. 13 and 14, however, the amplifier 660c for the shared band is connected to the triplexers 662a and 662b using only two switches 666a and 666b instead of four switches. While the four-switch solution is easier to implement, and exhibits better behavior over a wider frequency range (at the expense of more loss and greater cost), the limited frequency range of a two-switch solution is acceptable in many circumstances, even with the parasitics of "open physical stubs" on the amplifier's circuit board. The four-switch implementation, however, also offers the advantage the 4-switch solution has the electrical paths to place the extra filters to permit the "sloppy" diplexers, in order to regain some bandwidth as explained earlier.

FIG. 22 shows a simplified version of the amplifier of FIG. 14, with triplexer cut-off frequencies indicated in the triplexer blocks, and without the gain and tilt modules in the downstream and mid-bands depicted. For illustration purposes, FIGS. 23 and 24 each show a simple mathematical schematic of the filter response 600 when the mid-band is set to the downstream direction and filter response 605 when the mid-band is set to the upstream direction, respectively, for the amplifier of FIG. 22, where line 610 shows the filter response for the downstream signal, line 620 shows the filter response for the upstream direction, and line 630 shows the filter response for the shared mid-band. Note in these figures that two triplexer passes are included in one amplifier pass. As can be seen in FIG. 23, when the mid-band is set to the downstream direction, the upstream low pass filter 620 and the mid-band high pass filter 630 each have "unwanted" roll due to the low pass function at 396 MHz. This eliminates a part of usable downstream spectrum. As can be seen in FIG. 24, when the mid-band is set to the upstream direction, the mid band has a wanted low pass function at 396 MHz but also an unwanted high pass roll at 100 MHz.

FIG. 25 shows an amplifier/node 650 that modifies the design of the amplifier/node of FIG. 22 to first include triplexers 652a and 652b with near overlapping crossovers between the mid-band and the downstream band through amplifier 654 and the upstream band to the amplifier 655, respectively, and second to include supplemental filters 658 and 660 in the mid band amplifier path. Specifically, each of the triplexers 652a and 652b implement a first crossover from the dedicated upstream band at about 85 MHz, with only a very narrow guardband, and similarly implement a second crossover from the mid-band to the dedicated downstream band at approximately 492 MHz—again with only a very narrow guardband. The low-pass filter 658 in the upstream path from the mid band of triplexers 652a and 652b allows frequencies below 396 MHz, and in this manner allows upstream transmissions of everything up to 396 MHz, except for the very narrow guardband set by the triplexers so long as the double throw switches 656 are set to allow upstream signals to be amplified by mid-band amplifier 657. Similarly, the high pass filter 660 in the downstream path from the mid band of triplexers 652a and 652b allows frequencies above 108 MHz, and in this manner allows upstream transmissions of everything up to 108

MHz, except for the very narrow guardband set by the triplexers so long as the double throw switches 656 are set to allow downstream signals to be amplified by mid-band amplifier 657. Because the mid band power is limited, the filters 658 and 660 are preferably placed at the amplifier output so that their loss does not impact the amplifier noise. This may require slightly more power, but this is an acceptable trade-off. Those of ordinary skill in the art will appreciate, however, that one or both of the filters 658 and 660 may be placed at the amplifier's input.

FIG. 26 shows that, with the amplifier/node design of FIG. 25, the function of the triplexers is primarily that of power combiner/separation, while the role of isolation or loop gain suppression in the mid-band has been transferred to the mid-band amplifier filters. Those of ordinary skill in the art will appreciate that, since the filters 658 and 660 replace the function of a pair of triplexers, their order may be high, and will also appreciate that triplexers are still required to provide suppression in those parts of the band that are intentionally passed by the mid band amplifier filters. Separation of mid-band amplifier filter function in input and output filters around the mid band amplifier may therefore be more optimal, even with the trade-off with triplexer filter order (and thus complexity and loss).

With the mid-band set to the downstream direction, it is apparent that the available downstream bandwidth is enhanced, while crossover isolation at 100 MHz is retained. This is the most prevalent state of system operation, and thus adds valuable bandwidth to the downstream direction. Although, there will be some amplitude and phase signature from filters, gain and delay values at the "merge" point where the forward high frequency power amplifier and the mid band power amplifier combine their respective outputs, proper design can alleviate this problem. The signature in this merged region may be relatively well-controlled and more importantly stable (compared to ripple due to isolation problems or network reflections that inherently include massive delay differences and thus very fast ripples). Therefore, an OFDM scheme may even be able to operate within the merged region with an acceptable compromise on usable channels. With the mid-band set to the upstream direction, the upstream bandwidth can be similarly increased.

As noted earlier, control signals may be sent to the amplifiers/nodes to switch the mid-band between upstream and downstream modes on a desired timescale, e.g. fast or slow switching. Many different switching schemes may be adopted. For example, one switching scheme may comprise a Unidirectional CW-tone Based Control, which utilizes one or more downstream continuous wave (CW) signals to signal to the amplifier whether the mid-band should be switched to transmit upstream or downstream. The CW tone(s) preferably reside in the always-on downstream part of the spectrum, i.e., the high-band. Any appropriate frequency for the tone may be used to signal that the mid-band is to be assigned to the upstream. For example, a tone above 950 MHz tone could be used. Alternately, the specific frequency of the tone could be set above 1,002 MHz, which is the legacy DOCSIS 3.0 spectrum cut-off. In this manner, the available spectrum for legacy Set-Top Boxes (STBs) and modems may be further maximized. A tuned circuit in the amplifier would detect the presence of a signal above the predefined amplitude threshold and set the switches to the upstream transmit position. In the absence of the required tone, the switches would revert to a default state, e.g., the downstream transmit position in this case.

A more sophisticated control scheme might employ two tones, A and B, at two different frequencies; the presence of Tone A would enable US transmission of the mid-band, the presence of Tone B would enable DS transmission of the mid-band, and the presence of both tones (or neither tone) might trigger a failsafe or fault state that disabled the mid-band completely (by disconnecting all switches). Alternatively, a comparator might be used to compare the relative amplitudes of Tone A and Tone B and switch the mid-band direction based on which tone was stronger.

Moreover, a "can you hear me now" type of test could also be added to the foregoing scheme(s). First, a pair, or even a group of CW tones in the mid-band may be designated for performing a "mid-band direction transparency check," which could be CW tones specifically designated for this purpose, or could be already-present OFDM/OFDMA pilot tones. Second, if downstream high-band tone-based instructions are sent as per the schemes described above, the ability of receiving side to detect the presence of "transparency check" tones could be used to confirm that (a) the channel direction has been switched and (b) all the active elements (node ports and RF amplifiers) have switched.

As an example, assume that 203 MHz upstream and 257 MHz downstream are designated as the "transparency check" tones. If the mid-band direction has been instructed to switch to upstream, the modem that requested added capacity would then send a 203 MHz upstream tone, and the CMTS would check if it can receive the tone, with a level determined by various system aspects, well known to those versed in the art of setting amplifier cascades. If the result of the check is "YES", then such result is used as an ACK confirmation that the channel "transparency" in the desired direction has been established, and the requested transmission in the mid-band channel may begin in that desired direction. The downstream mode for the amplifier/node is analogous, except that the transparency check tone would be at 257 MHz and it would be the CMTS issuing the tone, while the modem that requested additional bandwidth would verify receipt of the tone, then notify the CMTS that the mid-band transmission in the DS may commence.

An alternate switching scheme may employ Bidirectional FSK-Based Control and Monitoring, which uses Frequency-Shift Keying (FSK) to implement a two-way communications channel between the DAA node and each amplifier. Low-cost, low-power FSK transceiver ICs are readily available that are capable of sending and receiving short messages (a few bytes) at a low bitrate (several kbps) in a narrow bandwidth (tens of kHz). The downstream signaling is preferably located in the always-on downstream band, e.g., a frequency above 804 MHz. The upstream signaling is preferably located in the always-on upstream, e.g., a frequency below 45 MHz would be suitable. In practice, the transceiver in the amplifier should preferably be augmented by a microcontroller, as shown in FIG. 27. The microcontroller preferably implements a simple communications protocol, and its I/O pins preferably control the state of the RF switches. The communications protocol could include some or all of the following: (a) regular polling of each amplifier by the DAA node, in whose absence the amplifier (and all other amplifiers on the communication path) would revert to a failsafe mode; (b) a timing distribution protocol, which would facilitate advance messaging of mid-band direction changes so that simultaneous switching of all amplifiers could occur; (c) monitoring of switch states; (d) monitoring of other aspects of the amplifier's performance, e.g., power supply quality, internal temperatures, RF output levels etc. and (e) the actual instructions to switch mid-band directions, with acknowledgments if required. Alternative signaling schemes employing modulation types other than FSK could be used to implement this scheme, if low-cost, low-power transceivers operating in the desired frequency bands become available.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An apparatus for implementing soft duplex operation of a communications network that transmits downstream signals from a service provider to a subscriber and upstream signals from the subscriber to the service provider, the apparatus comprising:

a pair of opposed triplexers defining a first signal path for a first frequency range through a first amplifier and for exclusively a downstream signal, a second signal path for a second frequency range through a second amplifier and for exclusively an upstream signal, and a third signal path for a third frequency range through a third, single amplifier, where said third frequency range is between said first frequency range and said second frequency range; and at least one switch that selectively alternates a third signal through the third, single amplifier between an upstream signal and a downstream signal; and including at least one gain and tilt module in the path of the third, single amplifier; and further including different gain and tilt modules for the upstream and downstream directions, respectively.

2. The apparatus of claim 1 implemented in an amplifier in a coaxial portion of the communications network.

3. The apparatus of claim 1 implemented in a node of the communications network, the node receiving an optical signal and outputting an RF signal.

4. The apparatus of claim 1 including at least one filter in the path of the third, single amplifier.

5. The apparatus of claim 4 where the at least one filter filters a signal amplified by the third, single amplifier.

6. The apparatus of claim 4 where the at least one filter includes a high pass filter and a low pass filter.

7. The apparatus of claim 4 where the at least one filter isolates a mid-band signal from the exclusively downstream signal and the exclusively upstream signal, respectively.

8. The apparatus of claim 1 where the at least one switch is a double throw switch.

* * * * *